United States Patent
Krishnan et al.

(10) Patent No.: US 9,083,818 B2
(45) Date of Patent: *Jul. 14, 2015

(54) INTEGRATED DISPLAY AND MANAGEMENT OF DATA OBJECTS BASED ON SOCIAL, TEMPORAL AND SPATIAL PARAMETERS

(71) Applicant: QUALCOMM Incorporated, San Diego, CA (US)

(72) Inventors: Kulathumani Krishnan, San Diego, CA (US); John Alexander White, Jr., Oceanside, CA (US); Mark A. Maggenti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/625,543

(22) Filed: Sep. 24, 2012

(65) Prior Publication Data
US 2013/0024473 A1    Jan. 24, 2013

Related U.S. Application Data

(63) Continuation of application No. 12/552,864, filed on Sep. 2, 2009, now Pat. No. 8,302,015.

(60) Provisional application No. 61/094,376, filed on Sep. 4, 2008.

(51) Int. Cl.
G06F 13/00 (2006.01)
G06F 15/00 (2006.01)
(Continued)

(52) U.S. Cl.
CPC ........... *H04M 1/72572* (2013.01); *G06Q 10/10* (2013.01); *H04M 1/72547* (2013.01); *H04M 1/72569* (2013.01); *H04M 1/72583* (2013.01)

(58) Field of Classification Search
CPC .......................... G06Q 10/10; H04M 1/72572
USPC ................ 715/736–740, 763–765, 747–751, 715/853–855, 753
See application file for complete search history.

(56) References Cited

U.S. PATENT DOCUMENTS 6,249,453 B1   6/2001   You et al.
7,975,399 B2   7/2011   Kikinis
(Continued)

FOREIGN PATENT DOCUMENTS

CN   101247427 A   8/2008
EP   1431897 A1   6/2004
(Continued)

OTHER PUBLICATIONS

International Search Report and Written Opinion—PCT/US2009/055832, International Search Authority—European Patent Office—Jul. 9, 2010.

(Continued)

*Primary Examiner* — Kevin Nguyen
(74) *Attorney, Agent, or Firm* — Raphael Freiwirth

(57) ABSTRACT

An embodiment is directed to displaying information to a user of a communications device. The communications device receives a query including a social parameter, a temporal parameter and a spatial parameter relative to the user that are indicative of a desired visual representation of a set of data objects. The communications device determines degrees to which the social, temporal and spatial parameters of the query are related to each of the set of data objects in social, temporal and spatial dimensions, respectively. The communications device displaying a first visual representation of at least a portion of the set of data objects to the user based on whether the determined degrees of relation in the social dimension, temporal dimension and spatial dimension satisfy the respective parameters of the query.

46 Claims, 27 Drawing Sheets

(51) Int. Cl.
*H04M 1/725* (2006.01)
*G06Q 10/10* (2012.01)

(56) References Cited

U.S. PATENT DOCUMENTS

| | | | |
|---|---|---|---|
| 8,302,015 B2 | 10/2012 | Krishnan et al. | |
| 2003/0142125 A1 | 7/2003 | Salmimaa et al. | |
| 2004/0119760 A1 | 6/2004 | Grossman et al. | |
| 2005/0159970 A1 | 7/2005 | Buyukkokten et al. | |
| 2006/0074883 A1 | 4/2006 | Teevan et al. | |
| 2007/0214141 A1 | 9/2007 | Sittig et al. | |
| 2007/0245267 A1 | 10/2007 | Nakamura et al. | |
| 2007/0271297 A1* | 11/2007 | Jaffe et al. | 707/104.1 |
| 2008/0070697 A1 | 3/2008 | Robinson et al. | |
| 2008/0086431 A1* | 4/2008 | Robinson et al. | 706/11 |
| 2008/0117201 A1 | 5/2008 | Martinez et al. | |
| 2010/0030740 A1* | 2/2010 | Higgins et al. | 707/3 |
| 2010/0299615 A1 | 11/2010 | Miluzzo et al. | |
| 2011/0119264 A1 | 5/2011 | Hu et al. | |
| 2013/0191458 A1 | 7/2013 | Kulathumani et al. | |

FOREIGN PATENT DOCUMENTS

| | | |
|---|---|---|
| EP | 1755056 A1 | 2/2007 |
| JP | 2004199644 A | 7/2004 |
| JP | 2006107473 A | 4/2006 |
| JP | 2007280332 A | 10/2007 |
| KR | 20050077779 A | 8/2005 |
| KR | 20070026436 A | 3/2007 |
| RU | 2317585 C2 | 2/2008 |
| WO | WO2009023984 A1 | 2/2009 |

OTHER PUBLICATIONS

Supplementary European Search Report—EP09814990—Search Authority—The Hague—Sep. 20, 2011.

* cited by examiner

Minkowski Space - Time diagram

INTEGRATED DISPLAY AND MANAGEMENT OF DATA OBJECTS BASED ON SOCIAL, TEMPORAL AND SPATIAL PARAMETERS

CROSS REFERENCE TO RELATED APPLICATIONS

This application is a Continuation of U.S. patent application No. 12/552,864 filed Sep. 2, 2009, entitled "INTEGRATED DISPLAY AND MANAGEMENT OF DATA OBJECTS BASED ON SOCIAL, TEMPORAL AND SPATIAL PARAMETERS", which claims priority to Provisional Application No. 61/094,376, filed on Sep. 4, 2008 and entitled "INTEGRATED DISPLAY OF USER-CENTERED ACTIVITY AND SOCIAL PROXIMITY", each of which is assigned to the assignee hereof and is incorporated herein by reference in their entireties.

BACKGROUND

1. Field of the Invention

Embodiments are directed to providing an integrated display and management of data objects based on social, temporal and spatial parameters.

2. Description of the Related Art

In mobile telecommunication devices, such as cellular phones, PDAs, mini-laptops, and advanced pagers, the devices typically contain various types of information relating to contacts, calendar, email, and the like. Each type of information is typically categorized and presented to the user according to categories tailored for the particular type of information. For example, calendar information is typically presented chronologically. Contact information is typically sorted and presented in alphabetical order. In some cases two types of information may be integrated. For example, a calendar event may include contact information for persons invited to the event. The calendar event may further include location information if entered by the user.

Mobile devices typically have limited space for providing a user interface. In particular, a mobile phone device with a numeric keypad may have limited screen space and key functions to provide detailed information and user interface options. Users must typically page through numerous screens and scroll through numerous menu choices to find the information they are looking for. For example, if a user desires to find the contacts who have been invited to a calendar event, the user must typically have a priori information regarding the name and type of event. The user must then open the event and search through a list of contacts. If the user desires to find more information regarding each contact person's relationship or location, the user must open up each contact to find the information.

Such traditional user interfaces have limited ability to present information to the user that is intuitive and representative of how users actually think and perceive events, places, and people. People are typically perceived in terms of relationships and location. Events may be perceived more in terms of social importance and persons invited to the event, in addition to location. However, the traditional hierarchical, segmented, and menu driven structure of information provided in mobile devices do not provide such an intuitive and user friendly interface.

SUMMARY

An embodiment is directed to displaying information to a user of a communications device. The communications device receives a query including a social parameter, a temporal parameter and a spatial parameter relative to the user that are indicative of a desired visual representation of a set of data objects (e.g., people, places, things, multimedia such as pictures, and the like). The communications device determines degrees to which the social, temporal and spatial parameters of the query are related to each of the set of data objects in social, temporal and spatial dimensions, respectively. The communications device displaying a first visual representation of at least a portion of the set of data objects to the user based on whether the determined degrees of relation in the social dimension, temporal dimension and spatial dimension satisfy the respective parameters of the query.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION OF THE INVENTION

Figure 1:
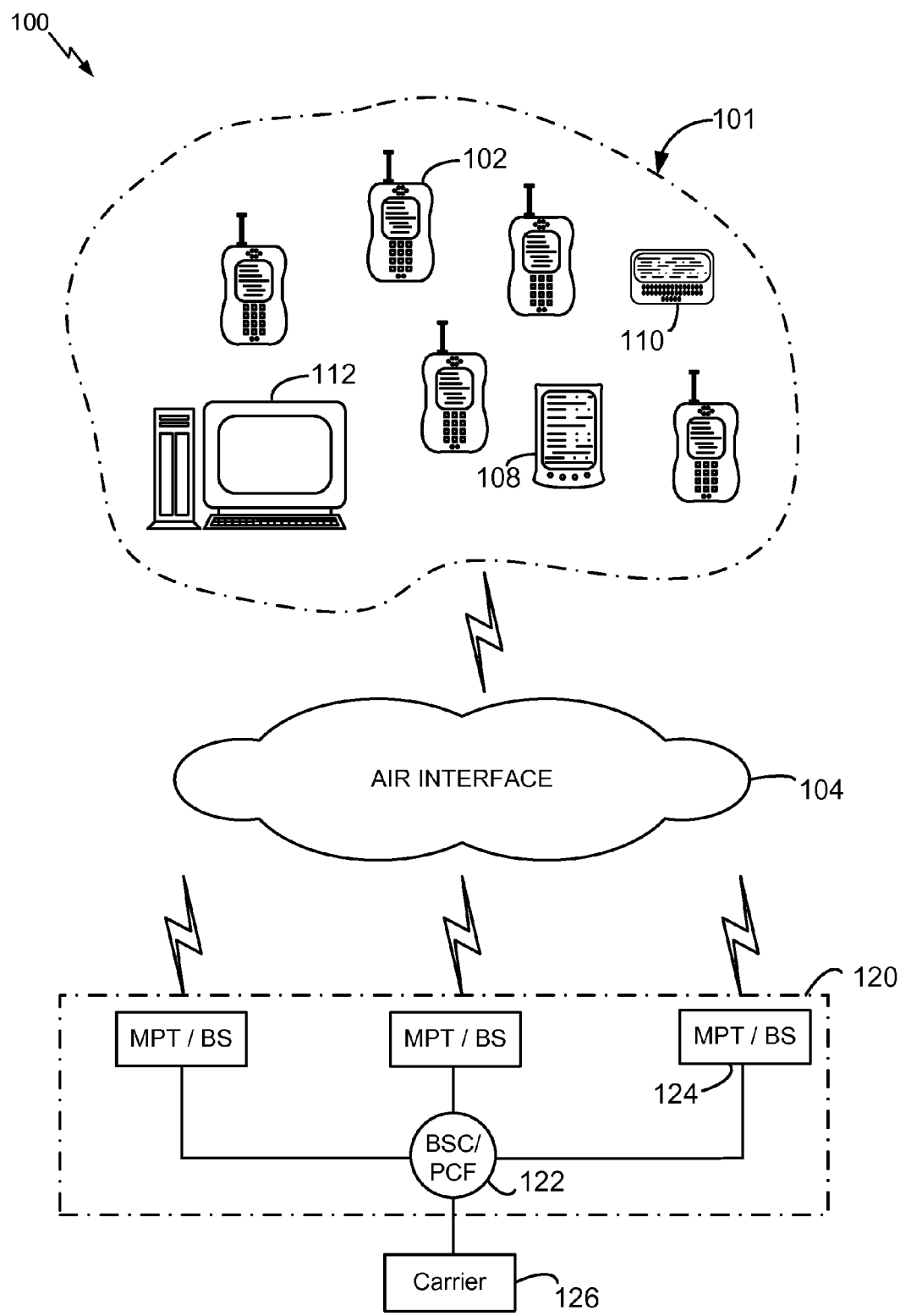
FIG. 1 is a representative diagram of a wireless network with a designated PTT group of wireless telecommunication devices communicating with a group communication server and other computer devices across the wireless network.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

In this description, the terms "mobile communication device," "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "group communication" means a point-to-point or point-to-multipoint communication sent between wireless communication devices across true or virtual half-duplex channels. The term "exemplary" means that the disclosed element or embodiment is only an example, and does not indicate any preference of user. Further, like numerals refer to like elements throughout the several views, and the articles "a" and "the" includes plural references, unless otherwise specified in the description.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as a user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such as a core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
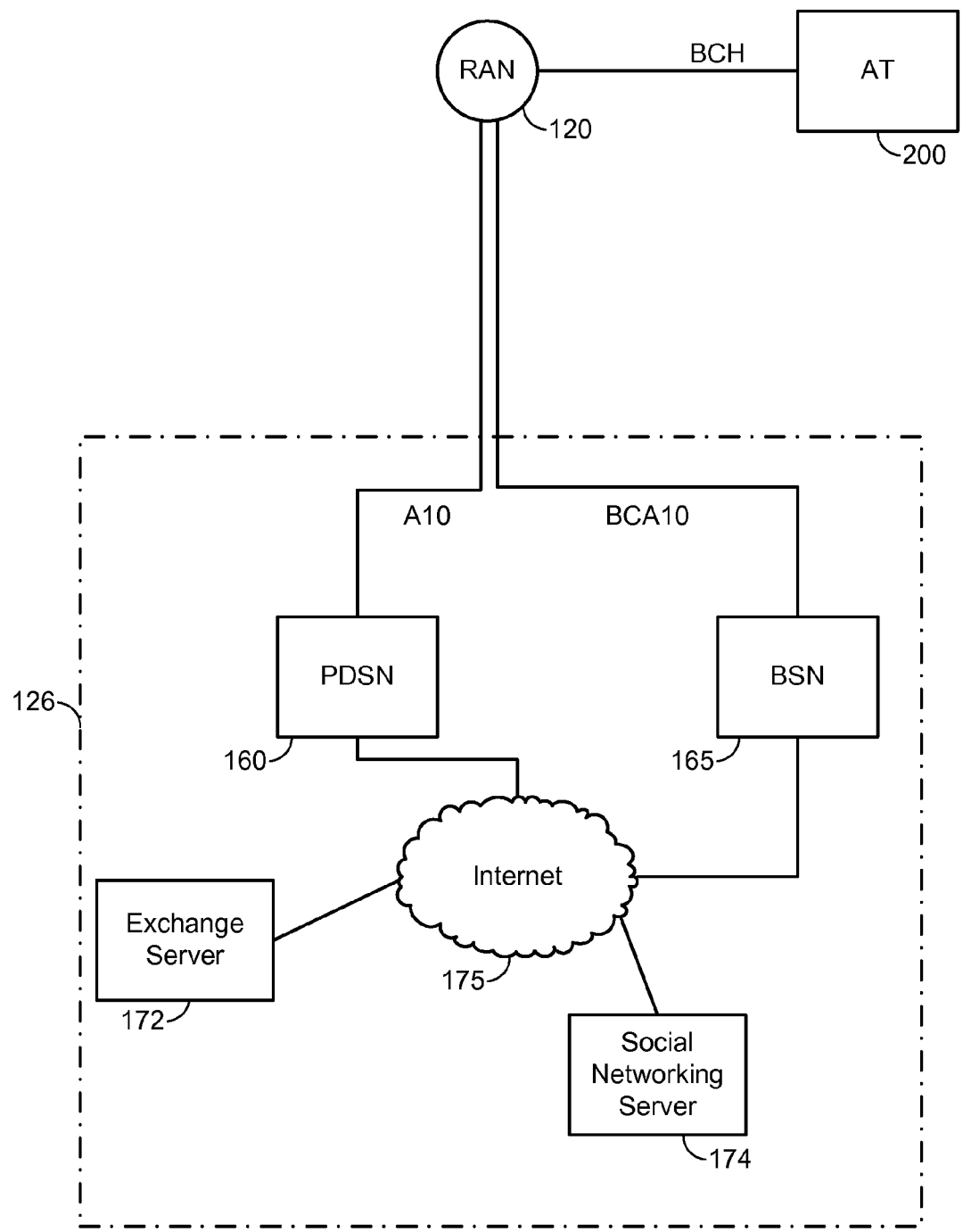
FIG. 2 is a representative diagram of one embodiment of a wireless network in a common cellular telecommunication configuration, having a group communication server control communications between the wireless telecommunication devices of PTT group members.

FIG. 2 illustrates the core network 126 according to an embodiment of the present invention. In the embodiment of FIG. 2, the carrier network 126 includes a packet data serving node (PDSN) 160, a broadcast serving node (BSN) 165 and an Internet 175. Also shown in FIG. 2 are an exchange server 172 and social networking server 174. However, the exchange server 172, social networking server 174 and/or other components may be located outside the carrier network in alternative embodiments. The PDSN 160 provides access to the Internet 175, intranets and/or remote servers (e.g., the servers 172, 174) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity. The broadcast serving node (BSN) 165 may be configured to support multicast and broadcast services. The BSN 165 communicates with the RAN 120 (e.g., the BSC/ PCF 122) via a broadcast (BC) A10 connection. The BCA10 connection is used to transfer multicast and/or broadcast messaging.

Referring to FIG. 2, the exchange server 172 corresponds to one or more distributed servers that support messaging and collaborative software accessible through the Internet 175. For example Microsoft Exchange Server is a widely used type of the exchange server 172. As will be appreciated, the exchange server 172 can store contact information (e.g., email contacts, addresses, etc.) as well as associated messaging (e.g., emails, etc.) and/or calendar information (e.g., meetings, appointments, etc.). Twitter is another example of a service that can be supported by the exchange server 172.

The social networking server 174 corresponds to one or more distributed servers that support social networking services (e.g., Facebook, MySpace, Orkut, etc.) to subscribers. The social networking server 174 stores information related to the subscriber profiles, as well as inter-subscriber information (e.g., a subscriber's friend list, family list, business contact list, etc.). The social networking server 174 can also evaluate and/or generate social maps of users, such as mapping subscribers that are indirectly related but do not have direct social links (e.g., a friend of a friend, etc.), and so on. The social networking server 174 can also store multimedia related to its subscribers, such as posted multimedia files (e.g., images, audio files, video files, text files, etc.) and their associated information (e.g., when the multimedia file was posted or generated, a location associated with the multimedia file such as where a picture was taken or a sound was recorded, subscribers or non-subscribers who are associated with the multimedia file such as people speaking in an audio file or a location a picture was taken, etc.).

As will be appreciated, the functionality of the exchange server 172 and the social networking server 174 can overlap such that the functionality of each server can be consolidated into a single server, or alternatively these different servers can be independent but can query each other for information when needed.

Figure 3:
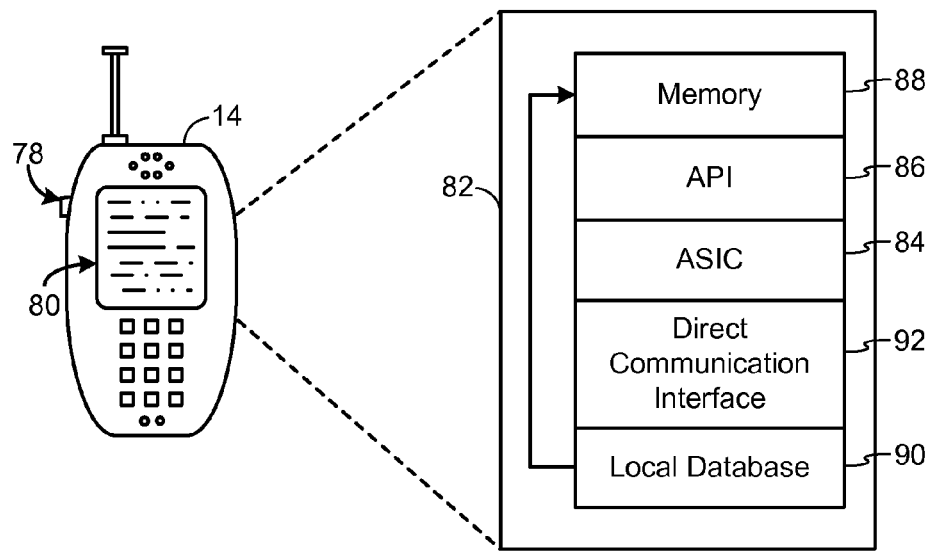
FIG. 3 is a block diagram illustrating the computer platform of the wireless telecommunication device with PTT capability.

FIG. 3 is a block diagram illustrating one embodiment of the wireless telecommunication device being a mobile telephone 14 with a PTT button 78 that opens the direct communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group-directed media. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information on the group-directed media, to include a file preview as is more fully described herein.

In this embodiment of the wireless device, the computer platform 82 also includes a direct communication interface 92 that can open a communication channel from the wireless device. The direct communication interface 92 can also be part of the standard communication interface for the wireless device which ordinarily carries the voice and data transmitted to and from the wireless device. The direct communication interface 92 typically is comprised of hardware as is known in the art.

Figure 4:
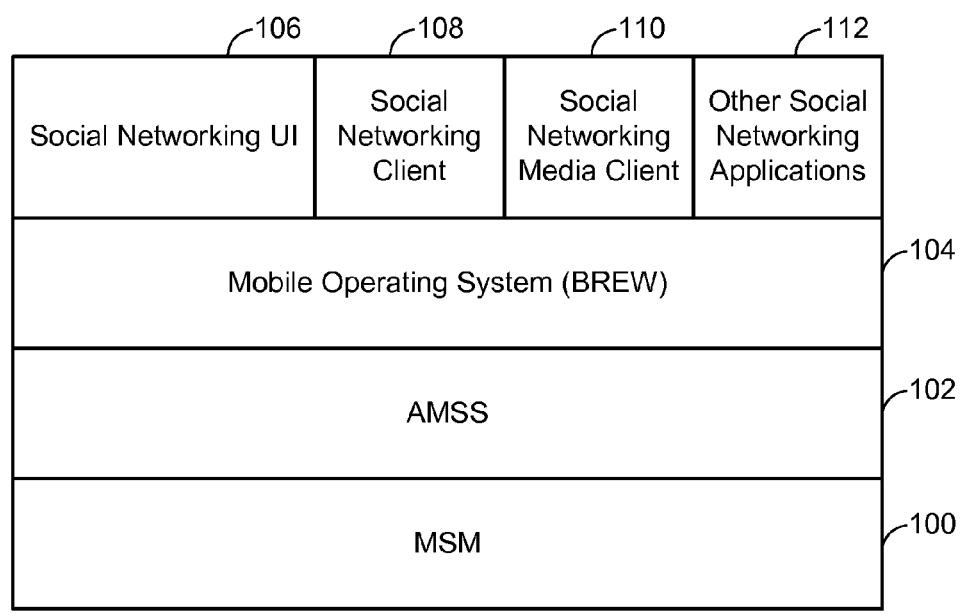
FIG. 4 is a diagram of one embodiment of the software layers of the communication group application, with a PTT client and a group-directed media client.

FIG. 4 is a diagram of one embodiment of the software layers that are configured for execution on the wireless device 14. In this embodiment, the computer platform 82 in the mobile device environment consists of a series of software "layers" developed on top of the Mobile Station Modem (MSM) 100 and the Advanced Mobile Subscriber Software (AMSS) 102, developed by QUALCOMM, drives the underlying MSM chipset and implements the software protocol stack for the entire suite of CDMA communication technologies that include CDMA2000 1X and CDMA2000 1xEV-DO. There is a mobile operating system layer 104, which in this embodiment is BREW®, also developed by QUAL-COMM. The mobile operating system layer 104 application programming interfaces for chip- or device-specific operations, while providing an isolation layer that eliminates direct contact to the AMSS 102 and any OEM software on the computer platform. The mobile operating system layer 104 enables application development that uses mobile device features without having to rewrite the application each time a new release of the device-specific software is released.

The social networking client 108 is an application that offers access to social networking services (e.g., connections to Facebook, MySpace, etc.) through an external interface, here shown at a social-networking-aware UI 106. The social networking client 108 includes all the functions required to enable mobile operating system 104 applications, such as a social networking media client 110. In addition to providing access to social networking services with the social networking client 108, the social networking client 108 can act as an isolation layer between all social networking-aware applications and the interface to the social networking server 174, in an example. In this embodiment, the social networking client 108 maintains access to social networking services, responds to social networking communication requests, processes all social networking-aware mobile operating system applications requests for social networking services, and processes all outgoing social networking requests.

Figure 5:
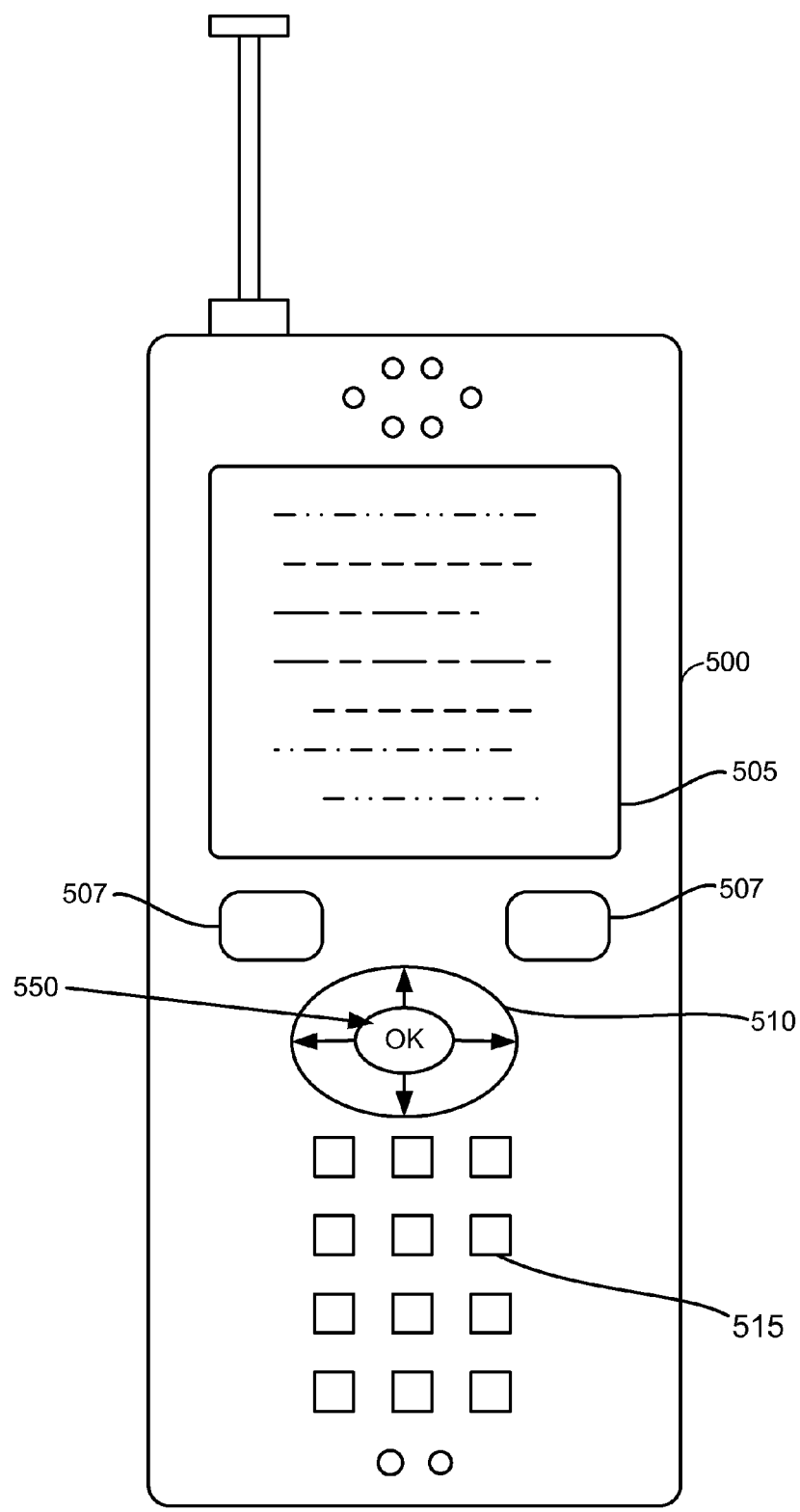
FIG. 5 is an exemplary mobile communications device.

The social networking media client 110 is a mobile operating system-based application that extends social networking services for access to media associated with social networking (e.g., a group session between socially networked contacts, an exchange of image data, video data, etc., between socially networked contacts and/or the social networking server 174, etc.). Referring to FIG. 5, illustrated is an exemplary mobile communications device 500, and in particular, the user interface for the device. The mobile communications device 500 includes a display 505 (e.g., an LCD or OLED display). In some embodiments, the display 505 may include touch screen capability. The mobile communications device 500 may include a keypad 515 (e.g., a standard phone keypad, a QWERTY keypad, a physical tactile response keypad, a soft key-pad via a touch-screen, etc.). The mobile communications device 500 may also include navigation buttons 510 that may further comprise up, down, left, and right keys for navigating through the display 505. In an example, the navigation buttons 510 may correspond to a directional pad capable of acquiring a desired direction from a user in other directions (e.g., up-left, down-right, etc.). The navigation buttons 510 may further comprise a selection or OK key 550 to indicate the user's selection or acknowledgment of a particular function. The device may also include soft keys 507 that are programmable and used to select the function as indicated in an area of display 505 near the soft keys 507.

In various embodiments, a system, method, and communication device are disclosed for providing integrated data management, visualization and user interface capabilities on the communication device (e.g., a mobile communications device). The user interface may provide a visual representation (e.g., a social map, a location map, a time-line of activities, etc.) of 'data objects' (e.g., activities, events, socially networked contacts, multimedia files, etc.) along a temporal dimension (e.g., a timeline), a spatial dimension (e.g., based on a distance to the user or a specified location) or in a social dimension based on a social proximity of the data object itself (e.g., based on an expected amount of interest the user has in the activities and/or socially networked contacts being evaluated).

In one embodiment, the temporal dimension may be configured to convey past or historical information (e.g., for past activities or past locations of socially networked contacts), present information (e.g., based on real-time information or information expected to be indicative of a current time) or future information (e.g., based on a projected schedule of events, a calendar of a socially networked contact, etc.). The data object may further be presented within a user-selectable band of chronological time. For example, bands may represent past events, current events or planned (future) events. The time bands may comprise successive bands of future time. In various embodiments the present disclosure may be variously be referred to as "integrated display" or "integrated zoom."

In further embodiments, within user-selectable time-based bands of data objects (e.g., events, activities, multimedia files and/or contacts), data objects already completed or planned with users and groups may be represented along a dimension of social proximity (i.e., a 'social dimension'), depicted by differential sizes and shapes of artifacts or icons (e.g., whereby each artifact is configured to have a visual prominence indicative of the data object, whereby similar data objects can be represented by similar artifacts to aid the user's visual recognition of the event and/or contact). By providing the capability to pan across data objects in different spatial, social and/or temporal dimensions (e.g., events and activities that have occurred or locations visited by socially networked contacts within a current time band), users can extract and retain context based on various attributes of the data objects. In an example where the data object corresponds to an activity, such attributes may comprise:

(a) Who, or the people with whom the activity was accomplished or is planned;

(b) What, or the nature of the activity accomplished or planned;

(c) When, or the time of the past, current or planned activity;

(d) Where, or the location of the past, current or planned activity.

The contextual information obtained from the attributes of the activities may also be used to plan future activities. The user may repeat a specific activity immediately, or at a later time. Activities may encompass various actions that a user perform on a mobile device, such as push-to-talk, one-to-one, and conference voice calls, and push-to-share objects such as pictures, videos, notes, chats, emoticons, planned calendar events, and other pieces of information.

In yet another embodiment, a visual representation of a set of data objects (e.g., activities, events, socially networked contacts, etc.) may be implemented on axes within a three dimensional coordinate framework, with the axes corresponding to a spatial dimension (e.g., distance, etc.), a temporal dimension (e.g., time) and a social dimension (e.g., the user's expected amount of interest in the event or socially networked content, or 'social proximity'). By navigating over the spatial and social proximity axes or dimensions, a user may further be provided the capability to select contacts within a frame of reference for the purpose of commencing activities with the selected contacts. Thus, the particular data objects represented on the graph can correspond to event or activities with their associated spatial and temporal information, or alternatively can correspond to socially networked contacts of the user with their associated spatial and temporal information.

Alternatively, the visual representation itself need not display each of the dimensions, but the manner in which the data objects are displayed are still based on each of the three dimensions. For example, if the visual representation corresponds to a location map of a geographic area, the actual visual representation displays the spatial dimension. However, the actual data objects displayed on the location map in their corresponding locations also satisfy the temporal and social parameters for the query in order to be displayed on the location map in the first place. Thus, while a geographic map is typically used to indicate location, in this case, the artifacts representing data objects that appear on the map also function to indicate that the respective data objects satisfy the other parameters of the query, and not merely the location parameter.

Figure 6:
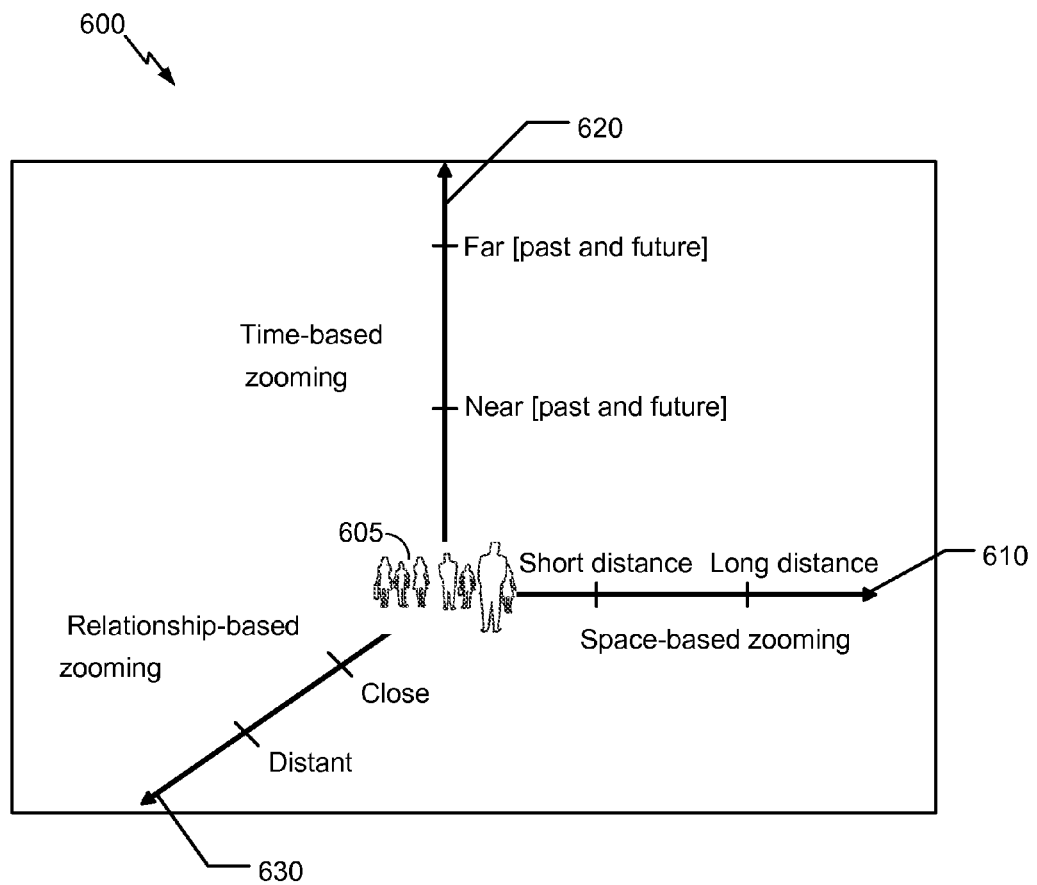
FIG. 6 is an exemplary three dimensional representation of time, relationship, and space based axes.

FIG. 6 depicts an exemplary coordinate system 600 for implementing some of the embodiments disclosed herein. In the figure, three orthogonal axes are considered for presentation of information and zooming, in relation to the user 605 considered to be the origin of the orthogonal axes. It will be appreciated that the origin of the orthogonal axes can be representative of any point that can be identified in terms of the social, spatial and temporal dimensions (e.g., such as a given subscriber or user's profile at a current time at the user's current location) so that the relative positions of the data objects in each dimension relative to the origin can be ascertained. On horizontal axis 610 (or x-axis), space-based zooming along the spatial dimension may be represented. In an embodiment the physical distance of a location associated with the data object from the point of origin (e.g., the user's location) may be represented along this axis. Vertical axis 620 (or y-axis) may be used to represent time-based zooming along the temporal dimension. In another embodiment, the amount of time, both past and present, may be represented along this axis. The third axis 630 (or z-axis) may be used to represent relationship-based zooming along the social dimension. In various embodiments this axis may be used to represent the social distance or proximity from the point of origin (e.g., such as the user's social profile). For example, data objects corresponding to close friends or family may be represented as closer to the origin than a distant acquaintance that may be represented as farther from the origin. Aside from the 'type' of the relationship (e.g., prioritizing family contacts over friends, etc.), the social proximity could also consider indirect relationships (e.g., a friend of a friend is closer than a friend of a friend of a friend, etc.).

In a further example, the point of origin of the visual representation for the data object representation in FIG. 6 may be indicative of a query (e.g., for a given user) specifying the point of origin (e.g., a subscriber's social profile, a time of interest and a location of interest) and a desired dimension range along each axes for display. Thus, in an example, if a given user wishes to view his socially network contacts within three (3) miles of his current position, the query consists of a social parameter (e.g., which can default to any direct friend of the user if the user does not narrow or expand on his/her requested contacts for viewing), a spatial parameter (e.g., the combination of the user's current position and its three-mile radius) and a temporal parameter (e.g., a current time, which can include a default time-range such that any locations of contacts known to be current with a threshold amount of time, such within the last 10 minutes, are considered to be 'current'). In this example, the visual representation would then include a display of each direct contact of the user currently within the specified three-mile radius. The actual representation of the contacts could be via an associated artifact (e.g., a picture of the contact, a picture of the location that the contact is at, a video indicative of the social relationship of the user to the contact, etc.).

While this example has been given in terms of socially networked contacts of the user, it will appreciated that activities could also be specified in a similar manner, such that the user queries for a display of his/her preferred activities as indicative in his/her social profile, or queries for a specific activity (e.g., golf, bowling) with the data objects corresponding either to socially networked contacts sharing an interest in the activity and/or locations where the activity is available (e.g., golf courses, bowling alleys, etc.).

For example, if the visual representation corresponds to a location-map, the visual representation can display a given location range with a field of zoom based on the spatial parameter, and the locations of each data object satisfying the spatial, social and temporal parameters can be shown at their corresponding locations within the given location range. Thus, the user can view the location-map and know that each artifact is associated with a matching result of the query and can infer its respective location. Alternatively, if the visual representation corresponds to a social-map, the visual representation can display the matching results in a manner such that the user's social relationship to the matching data objects can be inferred from the display. Alternatively, if the visual representation corresponds to a time-line, the visual representation can display the matching results in a manner such that the timing of the data object (e.g., an occurrence of an event, when a contact will be at a location corresponding to the spatial parameter, etc.) can be inferred from a visual inspection of the display.

Other representations may be implemented in various embodiments using two of the three types of information (physical distance, time, and social proximity). For example, space based zooming may be provided in two axes, with the horizontal axis representing longitudinal or east-west distance, and the vertical axis representing latitudinal or north-south distance. Various embodiments are contemplated by the current disclosure, in which a more integrated user interface may be provided to enable a user to access, view and manage information on a mobile device in a more intuitive fashion.

According to the tenets of activity theory, activity is the primary context from a human-centered perspective. Activity theory theorizes that when people engage and interact with their environment, various tools and processes may result. These tools and processes may be exterior manifestations of mental and social processes, and as such these tools and processes may be more readily accessible and communicable to other people. Such tools and processes may be particularly useful for social interaction. In a framework derived from activity theory, tasks and activities can be subdivided into actions, which are further subdivided into operations. In a system design context, using these categories can provide an understanding of the steps necessary for a user to carry out a task. The present disclosure contemplates the implementation of activity theory principles to provide an intuitive user interface for managing and accessing information on mobile devices.

Figure 7:
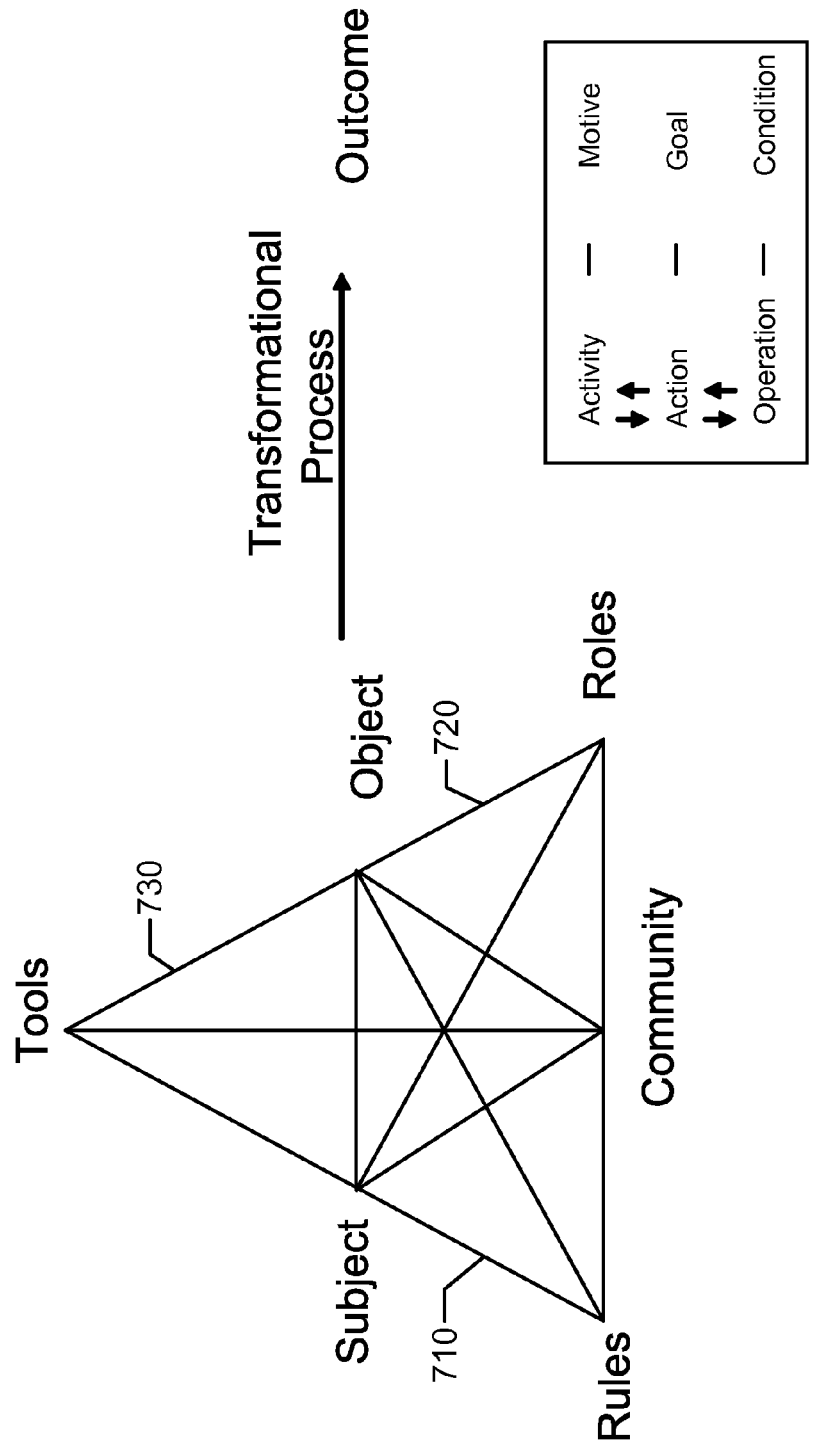
FIG. 7 is an exemplary diagram depicting activity centered design.

User activities may be considered within the framework depicted in FIG. 7. As will be appreciated, the description of FIG. 7 provides examples regarding how 'social proximity' or a degree of social relationship from the user (or point of origin) to a given data object (e.g., in this case, an activity) can be determined When considering human activity, three essential triads may be considered. 710 depicts the subject-rules-community triad. 720 depicts the community-roles-object triad. 730 depicts the subject-tools-object triad. In the Subject-Rules-Community Triad, people follow implicit and explicit rules within a community. Social networks are "scale-free" networks, containing a few hubs of highly-connected people and many satellites connected by spokes. Social networks continue adding newer people and hence keep growing. A new person is more likely to join a group that already has many "connections".

Figure 8:
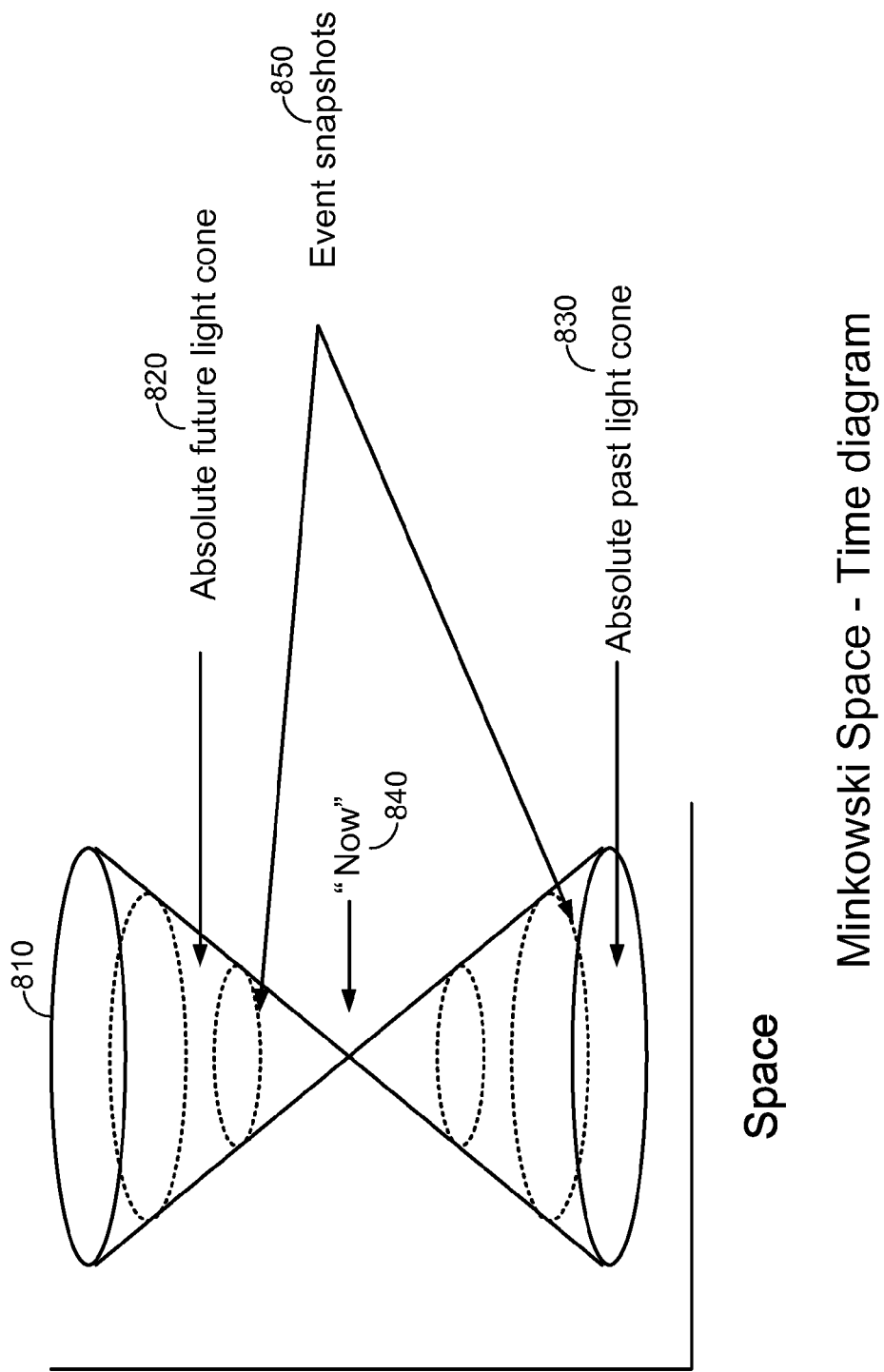
FIG. 8 is an exemplary space-time diagram.

In the Community-Roles-Object triad, for the purpose of performing an activity, people conform to hierarchies and take on roles for the division of labor. In the Subject-Tools-Object triad, people need mediation to perform activities via appropriate tools. The tools selected should provide adequate mediation for the object (objective) at hand. Using event snapshots from analogy with a Minkowski Space-Time diagram provides a mechanism to form and retain spatio-temporal context, by considering activities as "events." FIG. 8 depicts an exemplary Space-Time diagram 810. Future and past events may be represented by the absolute future light cone 820 and the absolute past light cone 830, with the intersection of the two cones indicating the present time 840. Events can then be represented as event snapshots 850 as slices of the past or future light cones. Again, while FIG. 8 is illustrated and described with respect to 'events', the same teachings can apply to other types of data objects, such as socially networked contacts of a user, where the 'event' corresponds to a location expectation of the contact at a particular time as inferred from the contact's calendar, meeting schedule, etc.

In view of the foregoing discussion, various views, filters and containers are disclosed that may enable users to perform activities in context. In an embodiment, three main views may be provided. In an embodiment of an activity map (e.g., which is an example of a visual representation of data objects corresponding to activities that match the parameters of a query from the user), the activity map view may present snapshots of activities as events on a timeline, analogous to events in space-time. Completed events may be indicated as historical events, and may be represented as "near" in past time for events occurring in the near past. Events in the more distant past may be represented as "far" in past time. Planned events may be indicated as future events, and events in the near future may be represented as "near" in future time. Events in the distant future may be represented as "far" in future time. Accordingly, if the temporal position of the point of origin, or the temporal parameter of the query, corresponds to the present, then the position of the data object in the temporal dimension corresponds how far away, in time, the data object (e.g., the event or activity, in this case) was, or is expected to be.

In an embodiment, navigation across the various data objects (e.g., events, contacts, multimedia files, etc.) as described above may be accomplished on a mobile communications device using available keys. In a device with a numeric keypad, soft keys may be used. A soft key is a button which may perform an assignable function dependent on the text or other indication shown on the display near the button at the moment that the button is pressed. In one embodiment, such soft keys may be used for zooming in and out through the display (e.g., where to 'zoom' means to modify the illustrated spatial, temporal and/or social dimensions of the visual representation for the data objects). In further embodiments, the five-button type navigation keys with left, right, up, down arrows and the OK button may be used. In some embodiments the OK button may double up as the push-to-share button.

In an embodiment, one soft key may be assigned as a "zoom out" function, and one soft key may be assigned as a "zoom in" function. Zooming out may traverse the time direction toward the past, or toward increasing event history. Zooming in may traverse the time direction toward the future or toward increasing planned events. In an embodiment of a three dimensional framework for representing activities, the time direction may be assigned to the Y-axis, as shown in FIG. 6. However, it will be appreciated that the user is permitted to zoom in any of the dimensions, not merely in time. For example, the user can zoom out with regard to the spatial dimension, which can correspond to increasing a range for the spatial parameter such that further distances satisfy the query of the user. In another example, the user can zoom in with regard to the social dimension, which can correspond to increasing the social requirements for the social parameter such that it takes closer social relationships to satisfy the query of the user (e.g., 'show only family members' is a narrower requirements as compared to 'show both friends and family members'). As will be appreciated, 'zooming' can correspond to expanding or contracting a field of view, or alternatively to a 'shifting' of a field of view so that the same amount of data is viewed from a different perspective (e.g., in a time example, the user can shift from a view of data objects occurring in the next week to a view of data objects occurring the following week, so that both views display one-week's worth of data objects, albeit in different time periods).

As the user navigates through the data objects in the visual representation, the user may select a given data object by highlighting (e.g., right-clicking) the given data object. By clicking on the OK button, the interface may provide details of the data object, such as an event. For example, the display may indicate the location, date/time, and invitees to the event. Alternatively, if the data object is a socially networked contact, then highlighting or selecting the data object may result in a display of the contact's profile or other information. The display may also indicate actions that may be selected by the user for the selected event. In the case that the data object is an event, such actions may include, for example, updating the event details, inviting other contacts, joining the event or cancelling the event. In the case that the data object is a contact, such actions may include messaging the contact, adding a comment to a wall of the contact's social profile, adding the contact as a friend, etc.

Figure 9:
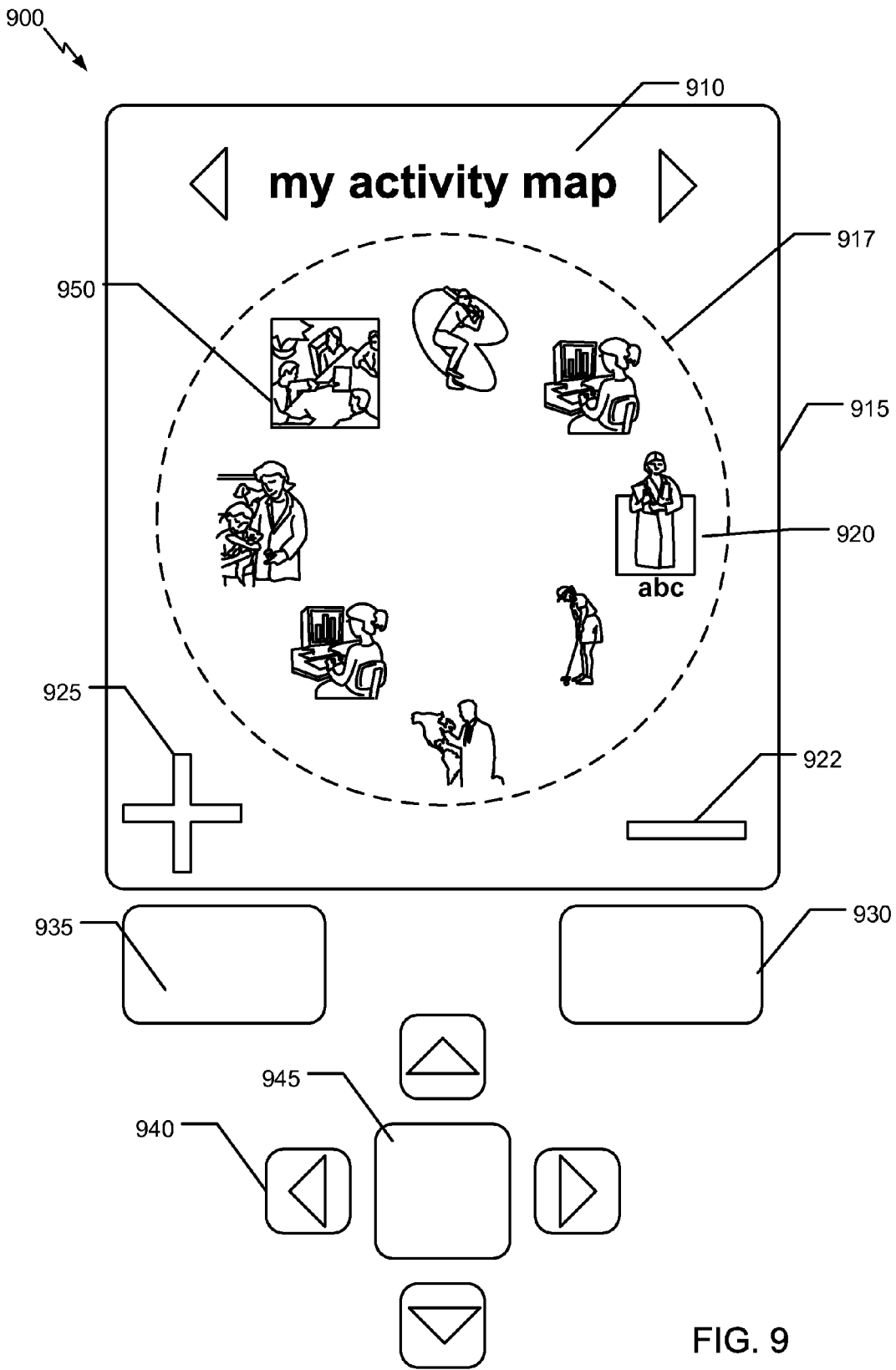
FIG. 9 depicts an exemplary user interface on a mobile communications device incorporating some of the embodiments disclosed herein.

Referring to FIG. 9, illustrated is an exemplary user interface 900 that may be implemented on a mobile communications device such as a cell phone. Display 915 may be an LCD or OLED display that provides visual representations of data objects to a mobile phone user. The display 915 may include a title area 910 that indicates the current type of user interface currently presented. In the example of FIG. 9, a plurality of data objects 950 may be presented in a radial fashion from a center point on the display. The data objects 950 may be presented as artifacts or icons as illustrated. Other embodiments may use thumbnails or other graphic indicators as desired. Some data objects 950 may be represented with user IDs or other means of identifying an artifact or icon within a limited display area. The specific manner by which a given data object 950 is illustrated or represented within the display 915 may be referred to as an 'artifact'. In an example, similar artifacts may be associated with similar data objects or among data objects that share a given proximity to the point of origin of the query among one or more of the spatial, social and/or temporal dimensions.

For example, if two particular data objects correspond to events taking place at the same time and/or location, the two data objects may share a common visual feature within their artifacts to convey this similarity. In another example, if two particular data objects correspond to events related to the same type of activity (e.g., two different bowling tournaments), the two data objects may share a common visual feature within their artifacts to convey this similarity (e.g., an image of a person bowling, of a bowling pin, etc.). In another example, if two particular data objects correspond to family contacts, the two data objects may share a common visual feature within their artifacts to convey this similarity (e.g., such as an image having a particular color background that is shared by all family members). In another example, icon or artifact 920 may be identified with a three letter acronym or initials of a contact. It will be appreciated that many different types of artifacts can be used for visually representing different data objects, and the example given above in this section are non-limiting.

Soft keys 930 and 935 may be assigned to functions as indicated on the display. Referring to the figure, soft key 935 may be assigned to the "+" indication 925. Soft key 930 may be assigned to the "−" indication 922 on the display. The user interface 900 may also include navigation buttons 940 for navigating in the up, down, left, and right directions. The interface may also include a selection button 945, typically embodied as an OK button.

As explained above, the user may navigate through the display by selecting the navigation buttons 940. In an example, the initial display of data objects 950 in the display 915 may be considered to be an initial query of the user, with the displayed data objects 950 satisfying initial settings for social, temporal and spatial parameters of the user. However, the user is not restricted to the initial display of data objects 950 in the display 915. Rather, for example, selection of left and right navigation buttons may scroll through different categories of data objects such as activities, locations, events, and the like. Navigating with the up and down buttons may move the active display area to upper and lower levels of hierarchy, such that one or more of the social, temporal and/or spatial parameters of the query are modified. For example, a current active area may be the activity icon area 917. By pressing the up arrow button, the active area may be shifted to the primary subject area 910, which in the figure indicates "my activity map." The user may then select the left or right navigation buttons to change the subject area, for example to "my things", which means the data objects displayed in the display 915 transition from activities (e.g., events, etc.) to things (e.g., multimedia files, etc.). After the user navigates to the desired type of data object, the data objects satisfying the current social, temporal and spatial parameters are displayed to the user, and so on. As will be described in greater detail below, the user can then modify the parameters (e.g., spatial, temporal and/or social parameters) of the query that are used to determine which data objects to display.

Figure 10:
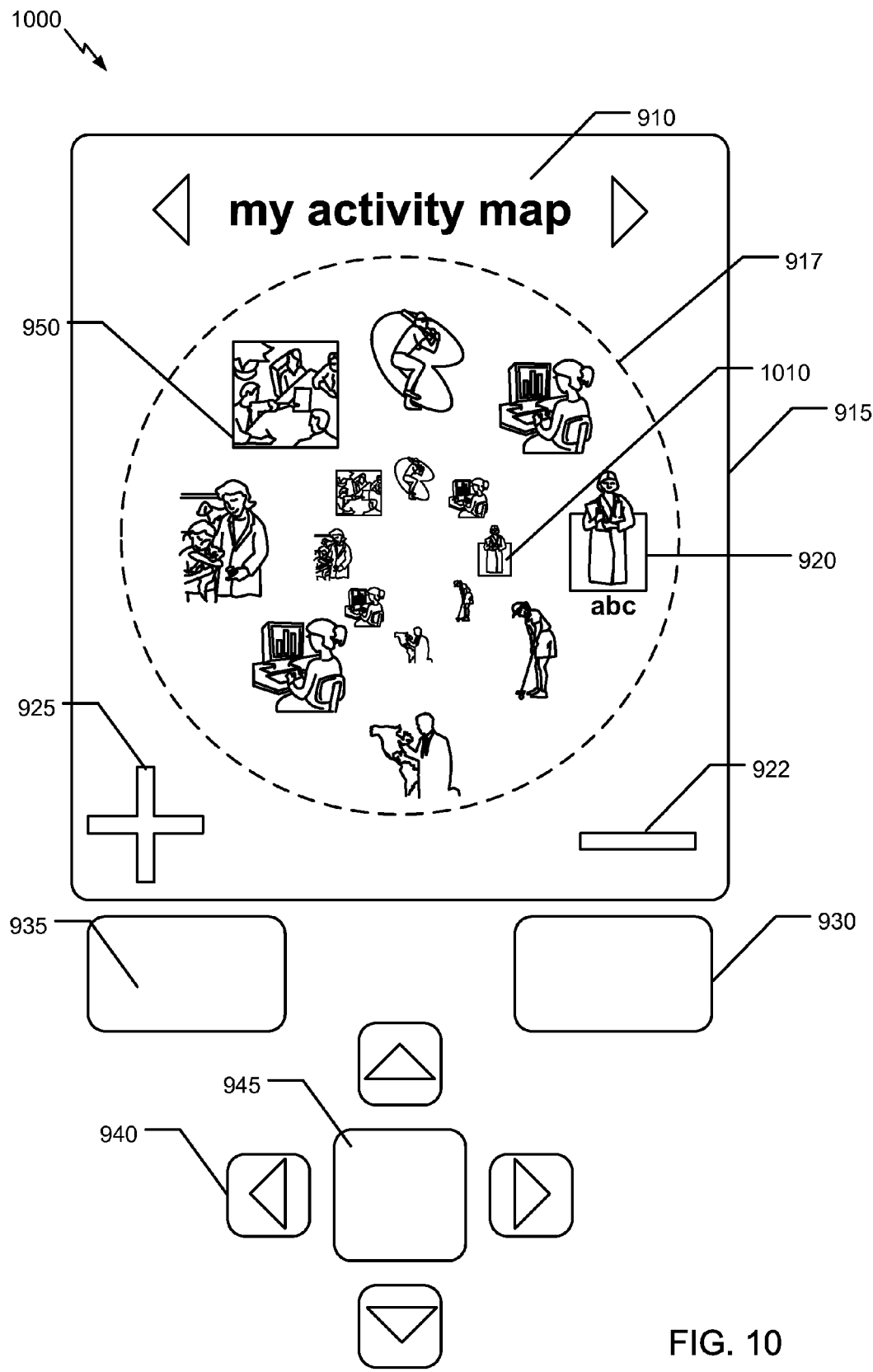
FIG. 10 depicts an exemplary user interface on a mobile communications device incorporating some of the embodiments disclosed herein.

When the active area is the icon area 917, the user may select to zoom in or out by pressing the "+" or "−" zoom soft keys, which further modifies the social, temporal and/or spatial parameters for the data objects, thereby affecting which data objects are displayed to the user. Referring to FIG. 10, when a user presses the "−" zoom out button, one or more of the social, temporal and/or spatial parameters are modified such that the field of view may be expanded to include a new circle of data objects 950, with the previous circle of activities represented as a smaller circle 1010, indicating that the circle 1010 is further from view. In particular, zooming out, in this instance, means the point of origin for the query has changed, and a new set of data objects that are within a given range of the new point of origin in the social, spatial and/or temporal dimensions are displayed. As shown in FIG. 10, data objects more closely matching the updated query can be more prominently displayed in the display 915 (e.g., circle 950 is larger and more prominent than circle 1010, etc.). Likewise, if the zoom "+" button is selected, the field of view may zoom in to provide the circle of activities as previously indicated in FIG. 9. Accordingly, the zoom buttons permit the user to modify the point of origin for the query, such that the user can focus on different times, locations, social relationships, etc. in the display 915 (e.g., "show my friends who are at the baseball game now" can transition to "show me bowling tournaments taking place tonight near my house", etc.). The user can also modify the dimension ranges that will satisfy the query for each circle or level, such that the user can expand or contract the data objects displayed relative to the same point of origin (e.g., "show me next week's activities" can transition to "show me next month's activities", and so on).

Figure 11:
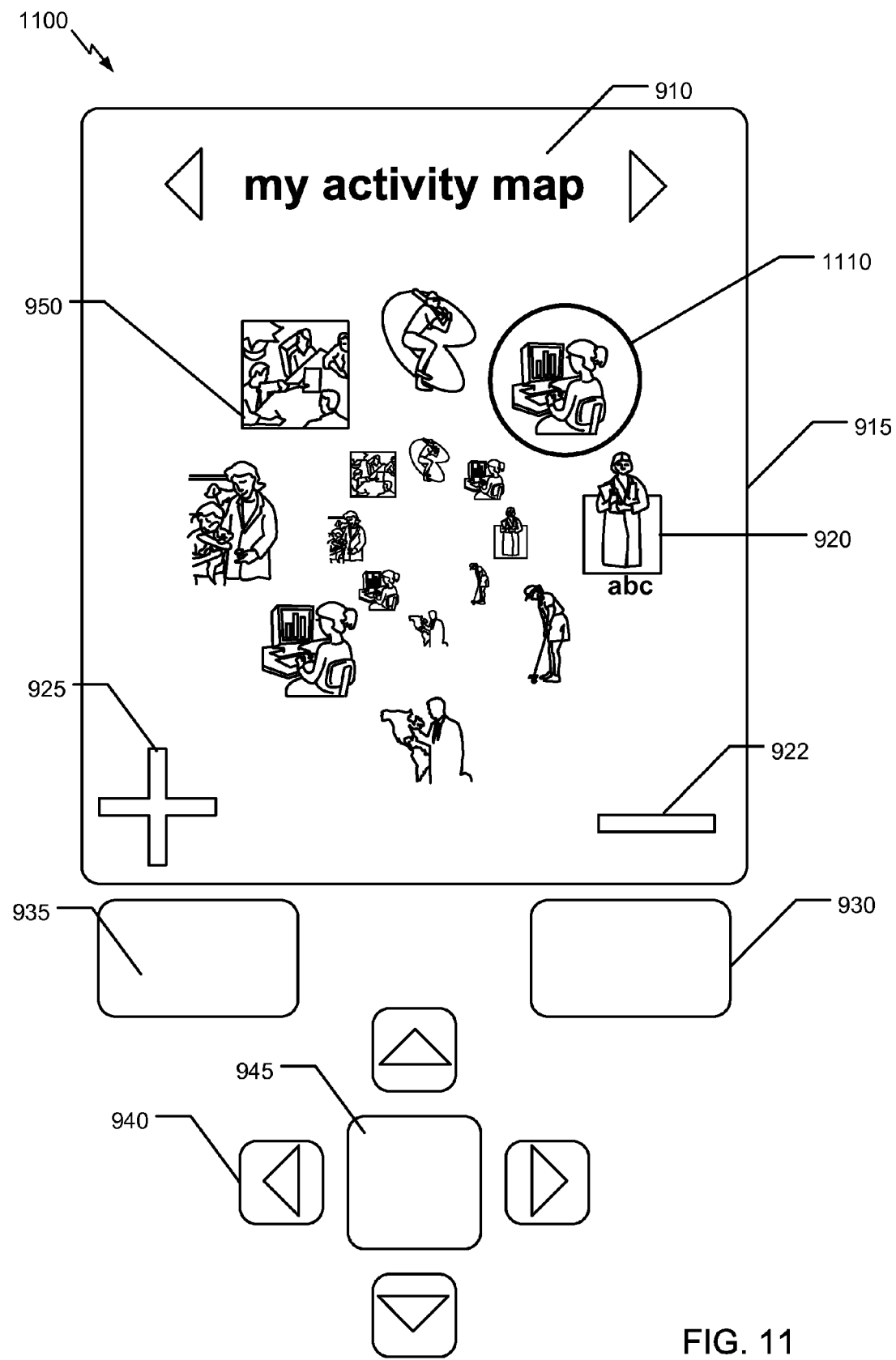
FIG. 11 depicts an exemplary user interface on a mobile communications device incorporating some of the embodiments disclosed herein.

The user may further use the up, right, left, and down navigation keys to choose a field of view, and further to select items within the field of view. For example, referring to FIG. 11, a user may use the up and down navigation buttons to move the selected field of view from the title area 910 to the icon area 950. The user may then use the right and left navigation keys to select a particular icon as the currently active icon or artifact. In the example shown in FIG. 11, a circle 1110 indicates a currently active icon or artifact. Other methods of indicating an active icon or artifact may be used, such as highlighting, creating shadow effects, and the like.

In an embodiment, visual representations for the data objects (e.g., activity maps, etc.) may be created and modified via a website (e.g., maintained by the social networking server 174, etc.) and may be uploaded via the internet 175. For example, a web-based service may provide access to a user account associated with the mobile communication device. The service may authenticate a user and provide the user with various account management functions. The user may further be able to create and modify social networking information using the web service. Once the user has created or modified social networking information on the website, an over-theairwaves download may provide the information to the handset, thus updating the new information on the handset.

In an embodiment, a new data object may be generated by providing a new data object wizard to facilitate intuitive and efficient creation of new data objects (e.g., new contacts, activities and/or events). Such a wizard may provide, for example, a mechanism to select people/contacts, places/locations, data or media entities/things, and a time value. The time value may not be a specific time or date, but may be selected relative to a current time value. For example, a user may select a person in a contact list, select a location, and select a time value that may indicate a "now" versus "later" choice.

In another embodiment, the visual representation may correspond to a social map representing contacts and groups along a dimension of social proximity. Contacts may include individuals, organizations, and other entities. Groups may comprise collections of contacts as defined by the user or by the device. Social proximity may generally be defined as an indication of a degree of a relationship, typically between two persons, along the social dimension. In one embodiment, icons or artifacts may be displayed on the mobile communications device indicating "close" and "distant" people/contacts (e.g., close contacts may be displayed more prominently than distance contacts, etc.). Such a representation may provide an indication for a user to quickly and intuitively ascertain social relationships. Social proximity may, for example, be indicated as "closer", "distant", "friend", "friend-of-a-friend" and the like. Alternatively, social proximity determined by the number and/or type of social interactions (e.g., based on a number of exchanged instant messages or emails, a number of pictures the user and the contact appear in the same picture together, etc.).

As indicated above, in one embodiment, navigation across the various data objects (e.g., contacts) may be accomplished on a mobile communications device using available keys. Examples in the embodiments given above with respect to FIGS. 9 through 11 have generally described the data objects and associated artifacts as being activities or events, whereby the visual representation of the data objects becomes an activity map. If the data objects are restricted to socially networked contacts, the resultant visual representation may be referred to as a social map, as will now be described with respect to FIG. 12.

In a device with a numeric keypad, soft keys may be used. In an embodiment, navigation across the data objects may be accomplished by using soft keys on the mobile communications device for zooming in and out through the visual representation (e.g., social map) of the data objects. In further embodiments, the five-button type navigation keys with left, right, up, down arrows and the OK button may be used. In some embodiments the OK button may double up as the push-to-share button.

As discussed above, one soft key may be assigned as a "zoom out" function, and one soft key may be assigned as a "zoom in" function. Zooming in and out may result in updating the corresponding number of contacts or people in the frame of reference. For example, zooming out may increase the number of contacts or people within the frame of reference based on social proximity, as indicated by the number and placement of icons or artifacts on the display 915. In an example, in terms of social proximity, an example of "zooming-in" may be to transition from a display of family and friends to a display of friends-only or family-only. In another example, an example of "zooming-out" may be to transition from friends-only or family-only to a display of family and friends. Alternatively, a "shift" of the displayed social proximity can also occur, whereby the display transitions from a display of friends-only to a display of family-only.

Figure 12:
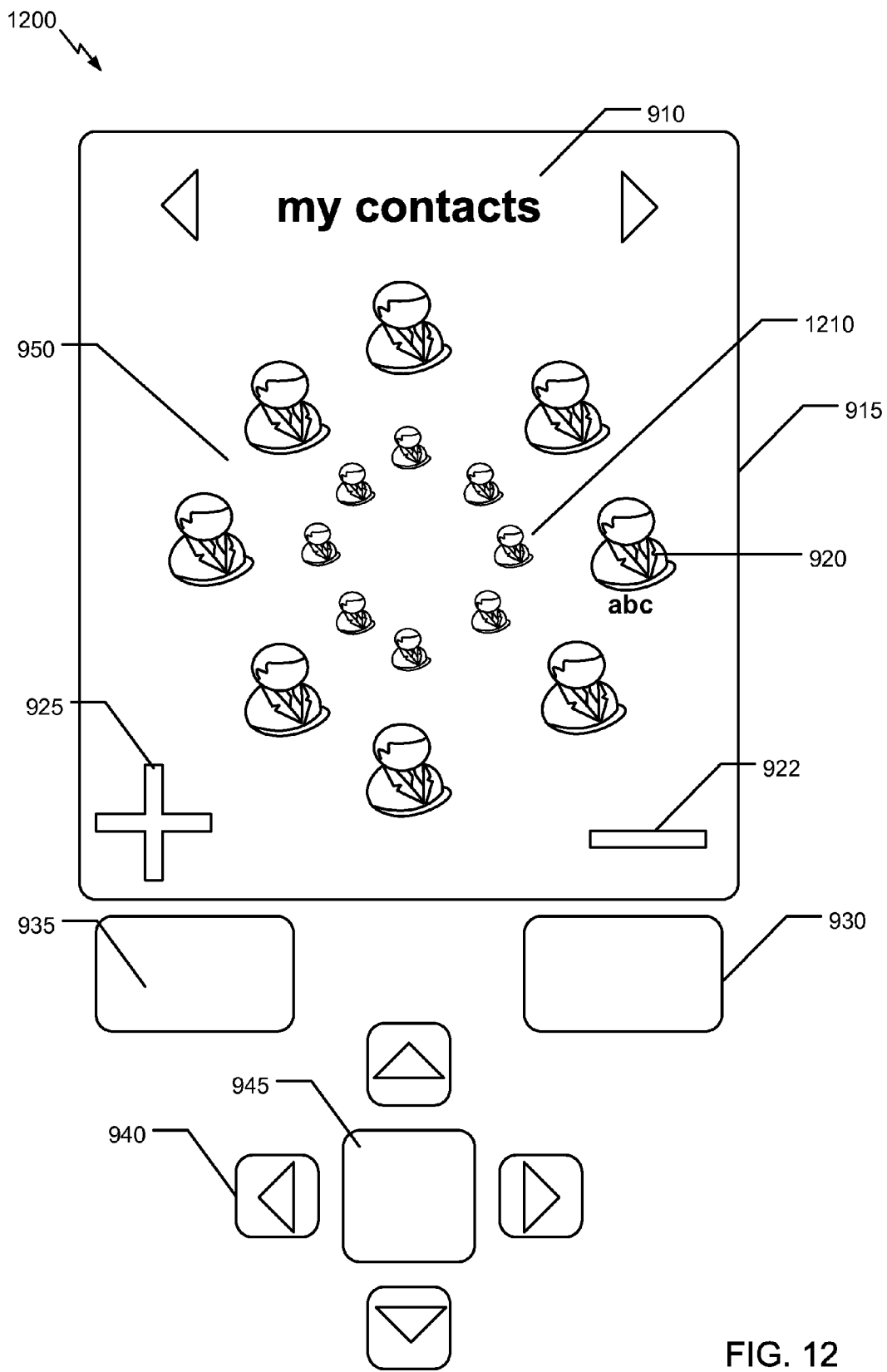
FIG. 12 depicts an exemplary user interface on a mobile communications device incorporating some of the embodiments disclosed herein.

Referring to FIG. 12, illustrated is an exemplary user interface 1200 that may be implemented on a mobile communications device, providing a social map comprising personal contacts. Display 915 may be an LCD or OLED display that provides visual representations of data to a mobile phone user. The display 915 may include a title area 910 that indicates that the current type of user interface currently presented is "my contacts." Accordingly, in FIG. 12, the data objects under consideration correspond to the socially networked contacts of the user. Various contact icons or artifacts 920 may be presented in a radial fashion from a center point on the display. Other embodiments may use thumbnails or other graphic indicators as desired. Some contacts 920 may be presented with user IDs or other means of identifying an icon within a limited display area. For example, icon or artifact 920 may be identified with a three letter acronym or initials of a contact.

Soft keys 930 and 935 may be assigned to functions as indicated on the display. The user interface 900 may also include navigation buttons 940 for navigating in the up, down, left, and right directions. The interface may also include a selection button 945, typically embodied as an OK button.

As explained above, the user may navigate through the display by selecting the navigation buttons 940. For example, selection of left and right navigation buttons may scroll through different categories of contacts such as those limited to a particular alphabetic range or groups that have been identified by the user. Navigating with the up and down buttons may move the active display area to upper and lower levels of hierarchy. For example, a current active area may be the activity icon area 917. By pressing the up arrow button, the active area may be shifted to the primary subject area 910, which in the figure indicates "my contacts." The user may then select the left or right navigation buttons to change the subject area, for example to "my things." Further active areas may be provided to indicate whether the current display indicates a particular alphabetic range, the user's defined groups, or other categories.

When the active area is the icon or artifact area, the user may select to zoom in or out by pressing the "+" or "−" zoom soft keys, upon which closer or farther levels of contacts may be provided on the display area 915. In this case, the user can either (i) change the point of origin for the query to change the display of the data objects, or (ii) can modify the dimension ranges from the point of origin in the spatial, temporal and/or social dimensions to adjust which data objects qualify for display. As indicated in FIG. 12, an outer circle of icons or artifacts may be provided indicating a more distant social proximity for those contacts represented in the circle. The inner circle of contacts 1210 may indicate a closer or more intimate social proximity by virtue of their representation as being closer to the center point of the display. Alternatively, the larger artifacts of the outer circle may indicate a closer social relationship than the inner circle. When a user presses the "−" zoom out button, the field of view may be expanded to include a new circle of contacts, with the previous circle of activities represented as the smaller circle. Likewise, if the zoom "+" button is selected, the field of view may zoom in to expand the inner circle to the outer circle, and further provide a new inner circle comprising yet another closer or more intimate circle of contacts.

In a further embodiment, social maps may be created and modified via a website (e.g., maintained by social networking server 174) and may be uploaded via the internet 175. For example, a web-based service may provide access to a user account associated with the mobile communication device. The service may authenticate a user and provide the user with various account management functions. The user may further be able to created and modify data objects, such as contacts and groups, using the web service. Contacts and groups may further be created as aliases and placed along a social map provided by the website. Once the user has created or modified social map information on the website, an over-the-airwaves download may provide the information to the handset, thus updating the new information on the handset.

As the user navigates through the social map on the mobile device by selecting a zoom level, the user may select a contact or group by highlighting the contact or group. In one embodiment, by then clicking on the OK button, the people within the viewed social frame of reference may be selected. The interface may further provide details of the selected contacts or groups. For example, the display may indicate the names and contact information. The display may also indicate actions that may be selected by the user for the selected event. Such actions may include, for example, updating the contact details, inviting the contacts, or deleting the event. In an embodiment, a social map wizard may be provided to facilitate intuitive and efficient creation of new contacts and groups and initiating actions with them. By further progressing through a wizard, various activities such as making calls, sharing information, initiating games, and the like may be commenced or scheduled.

Those skilled in the art will appreciate that the various categories and types of social proximity indicators discussed above are exemplary and many implementations of a social proximity measure may be used to reflect a particular social or cultural context. For example, the above examples included social proximity measures such as "friend" and "relative." Another example is a social proximity measure based on the length of a relationship such as "recently met" or "long time friend." In various embodiments, the concept of social proximity may include any number of related measures that may be useful for a particular context.

In one embodiment, a social proximity measure of "trust" may be used to instantiate a dimension of social proximity that may be useful for a number of activities and transactions related to a user's mobile community. Trust can generally be considered a measure of a particular contact's trustworthiness with respect to transactions typically requiring authentication and security in other settings. For example, in an online system a trusted client may be an individual or entity with good credit and means for payment for online purchases. In a social networking context, a trusted contact may be a person who may be considered a trusted friend or family member in an online community, and a contact who may likewise be trusted by others in the online community.

In at least one embodiment, a social map view may present a social map representing contacts and groups along a dimension of trust. In other words, the social dimension may be indicative of how far a contact can be trusted, instead of how 'close' the contact is to the user (e.g., although these two criteria can certainly be correlated). Thus, 'distance' along the social dimension need not be based merely on emotional closeness due to a familial relationship, for instance, but could be based on a trust metric. For example, the user may have a sibling that he/she is very close to, but with whom the user has little trust (e.g., if the user's sister is a notorious gossip, the user can love his/her sister while not trusting the sister very far). If the social dimension is configured to indicate the degree of trust of the user, even a close relative could thereby not be 'close' from the perspective of a trust-relationship. As will be appreciated, the social parameter of the query can thereby either be to rank and display data objects in accordance with emotional social-closeness, or alternatively based on a different type of social-closeness such as trust.

Contacts may include individuals, organizations, and other entities, each of whom may be associated with a level of trust by the user. In one embodiment, icons or artifacts representing contacts may be displayed on the mobile communications device in a radial fashion, with icons closer to the center indicating higher degrees of trust. Such a representation may provide an indication such that the user may quickly and intuitively ascertain trust levels for contacts. Levels of trust may, for example, be indicated as "not trusted," "socially trusted only," "trusted for financial transactions" and the like. In one embodiment, the social map may only provide for two levels—trusted and not trusted. In other embodiments, more varied levels and types of trust may be included.

In one embodiment, the trust levels entered by one user may be pushed to other users in the mobile community. For example, when a user enters a new contact, the new contact, along with the contact's level of trust, may be pushed to other members in the user's social networking group. Alternatively, when a user modifies a contact's level of trust, the changes may be pushed to other members of the user's mobile community. Thus, once a user establishes a level of trust with a contact, the entire group or community may, by extension, be afforded the same level of trust by virtue of each user's membership in the group or community. One with skill in the art will recognize that such a process provides a means of authenticating contacts for various transactions and activities in the context of the mobile community. The initial user, by virtue of marking a contact with a level of trust, will have typically authenticated the contact as a result of personal knowledge and experience with the contact. Since the other members of the user's mobile community will typically trust the initial user by virtue of the user's membership in the mobile community, further authentication will typically not be needed in order for the new contact to be pushed to the other members as a trusted contact. As will be appreciated, the 'pushing' of trust levels for a socially networked contact of the user to other socially networked contacts of the user corresponds to a 'sharing' of data object attributes between users, which are themselves data objects. A more detailed explanation regarding how data objects and/or data object attributes can be shared between users will be described in greater detail below with respect to FIGS. 22A-22J.

The mobile device may provide various options for transactions and activities that may be allowed or enabled as a function of trust levels. In one embodiment, a mobile bidding mechanism may be implemented wherein offers and acceptances for financial transactions may be exchanged between trusted contacts within a social network. Because a threshold level of authentication may be presumed for a trusted network of contacts, such a bidding mechanism implemented among a mobile user community and their associated trusted contacts may provide a secure closed network for carrying out secure transactions without the overhead of continuous user identification/authorization and security protocols. One of skill in the art will recognize that such a mechanism may provide a more efficient and/or secure infrastructure compared to online systems in which inherent security may be difficult to implement.

Using such a social network of trusted contacts, various methods of electronic commerce may be implemented. As noted above, electronic bidding, including time based or price based bidding, may be implemented using such a framework. In other embodiments, electronic objects may be exchanged, the objects representing financial or other measures of value such as electronic coupons and certificates. As discussed above, because trusted contacts within a mobile community have been pre-authenticated by virtue of having been ascribed a trusted status by at least one user, such electronic objects of value may be exchanged with the contacts without the need for continuous identification and authentication.

In one embodiment, the mobile communication device may provide further options and settings to allow the user to configure the specific transactions and activities that may be allowed as a function of trust levels. General settings may be configured for enabling transactions depending on a contact's level of trust. Specific settings may also be provided to allow, for example, specific transactions to occur only for specifically marked contacts. For example, a user may configure the mobile device to allow all transactions associated with any contact labeled as "trusted." Alternatively, in an embodiment wherein three trust levels have been defined as "highly trusted," "trusted," and "not trusted," the user may configure the mobile device to only allow financial transactions associated with contacts labeled as "highly trusted." The user may additionally configure the mobile device to allow contacts labeled as "trusted" to receive data regarding financial activity, but not to receive offers for financial transactions. Those skilled in the art will recognize that many levels of trust and actions associated with the levels of trust may be implemented in a given mobile community context, using the infrastructure disclosed herein.

Figure 18:
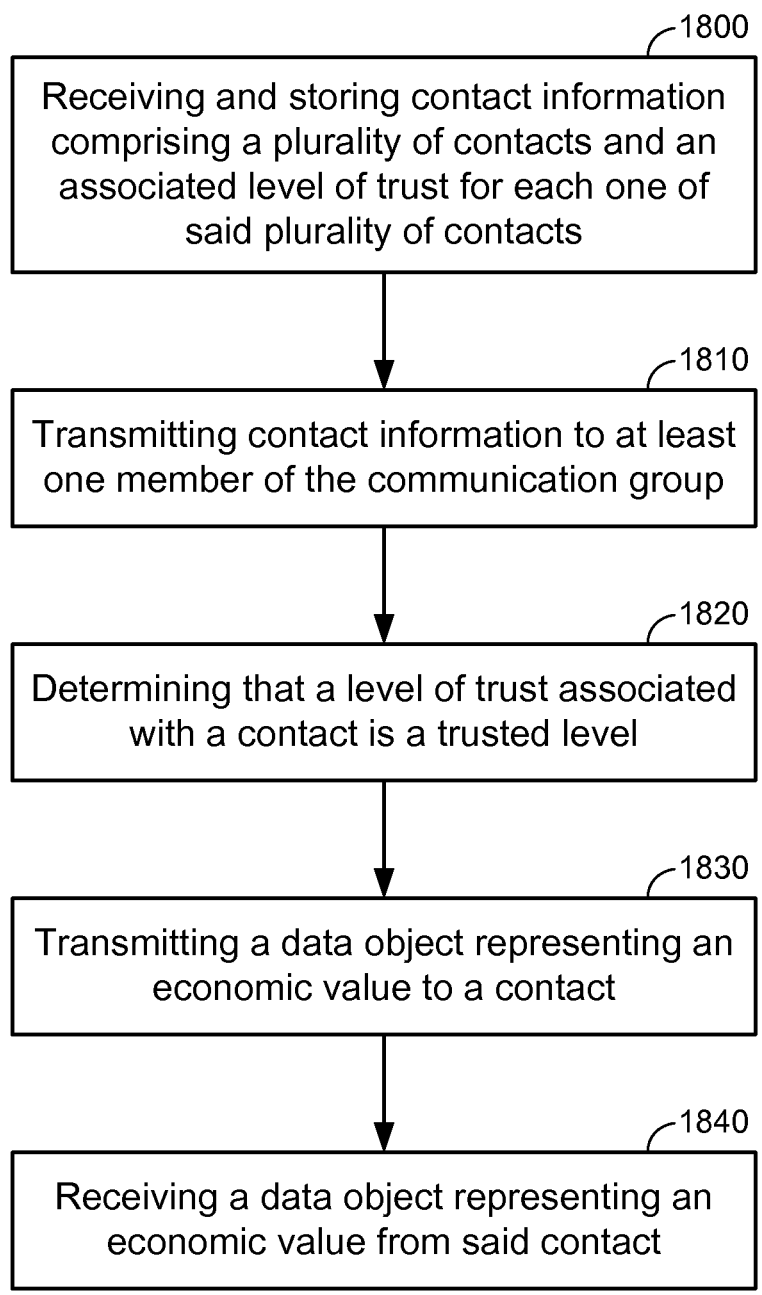
FIG. 18 depicts an exemplary process incorporating some of the embodiments disclosed herein.

Referring now to FIG. 18, illustrated is an exemplary process for displaying a user interface on a mobile communications device in accordance with some of the methods disclosed herein. The device may be a mobile communication device with a user that belongs to a social network through which the user can connect with other members of the social network over the wireless communications system. In 1800, a device may receive and store inputs from the user, the inputs including contact information of a plurality of contacts and an associated level of trust for each one of the contacts. The inputs may be provided by another system for receiving inputs, in which the system is associated with the mobile user's account (e.g., such as the exchange server 172, the social networking server 174, etc.). The inputs may also be provided directly by the user on the mobile device. Alternatively, the inputs may be retrieved from the device's memory if previously received.

In 1810, the device may transmit contact information to at least one member of its social networking group. For example, when a contact and an associated level of trust are entered into a mobile device, the device may automatically transmit the contact information to other members of the communications group. Alternatively, the device may prompt the user as to whether to transmit the contact information to other users. The level of trust may generally be a trusted level or a non-trusted level. Additional trust levels may be used in some embodiments.

A user may, for example, desire to transmit a financially sensitive data object, such as an object representing an offer to sell. The user may navigate to a social proximity screen on the mobile device and further navigate to a display of one or more trusted contacts available on the device, whereby the social proximity screen corresponds to a visual representation of the data objects, which in this case are socially networked contacts of the user. In 1820 the device may determine that a level of trust associated with each contact is a trusted level when displaying the display. In other words, assuming that a social parameter for the user's query related to the visual representation permits trusted contacts to be displayed thereon, then an artifact associated with each trusted contact can be displayed (e.g., so long as the trusted contacts also satisfy the spatial and/or temporal parameters of the query). The user may further select an option to transmit the offer to sell to each of the trusted contacts. In process 1830 the device may transmit a message representing an economic value of a produce or service for sale to each of the trusted contacts.

The trusted contacts, having received the offer to sell, may review the offer to sell. The trusted contacts may recognize that the offer to sell was received by a trusted contact, having stored the originating sender's contact information on their respective devices as a trusted contact. Finally, in process 1840 the originating sender may receive a message representing an acceptance of the offer to sell. Accordingly, FIG. 18 demonstrates a process by which the visual representation of data objects (e.g., contacts) can be used in association with an e-commerce transaction.

In another embodiment, a location map view may present a location map representing a spatial map with the user in the center, with contacts and groups situated outwards from the user. The contacts and groups may be represented by icons or artifacts on the location map, situated by their approximate spatial or geographic location. In other words, the artifacts associated with each data object (e.g., contacts, activities, etc.) are displayed at a position on the location map corresponding to their associated location, with their distance from the center (e.g., the user's position) corresponding to the degree of relation from the user's position, which in this example is the spatial point of origin for the query. The viewable area of the location map, in an example, can correspond to the bounds of the spatial parameter along the spatial dimension, such that data objects outside the viewable range are not displayed on the location map.

In an embodiment, navigation across the contacts and groups may be accomplished by using soft keys on the mobile communications device for zooming in and out through the location map. For example, zooming-in on the location map narrows the viewable location range, which restricts the number of data objects that are displayed, whereas zooming-out on the location map expands on the viewable location range, which can increase the number of data objects that are displayed. In a further example, the user can shift in either direction along the location axis, whereby the viewable range is unchanged but the axis portion that is displayed is modified (e.g., the location map displays a two-mile radius from a different spatial point of origin without modifying the actual radius of the location map). In further embodiments, the five-button type navigation keys with left, right, up, down arrows and the OK button may be used. In some embodiments the OK button may double up as the push-to-share button.

One soft key may be assigned as a "zoom out" function, and one soft key may be assigned as a "zoom in" function. Zooming in may update the display and represent contacts spatially closer to the user. Zooming out may increase the spatial frame of reference and display contacts with an increasing spatial area for display. In another example, a soft key can be used for shifting in either direction on an axis without zooming-in or zooming-out.

Figure 13:
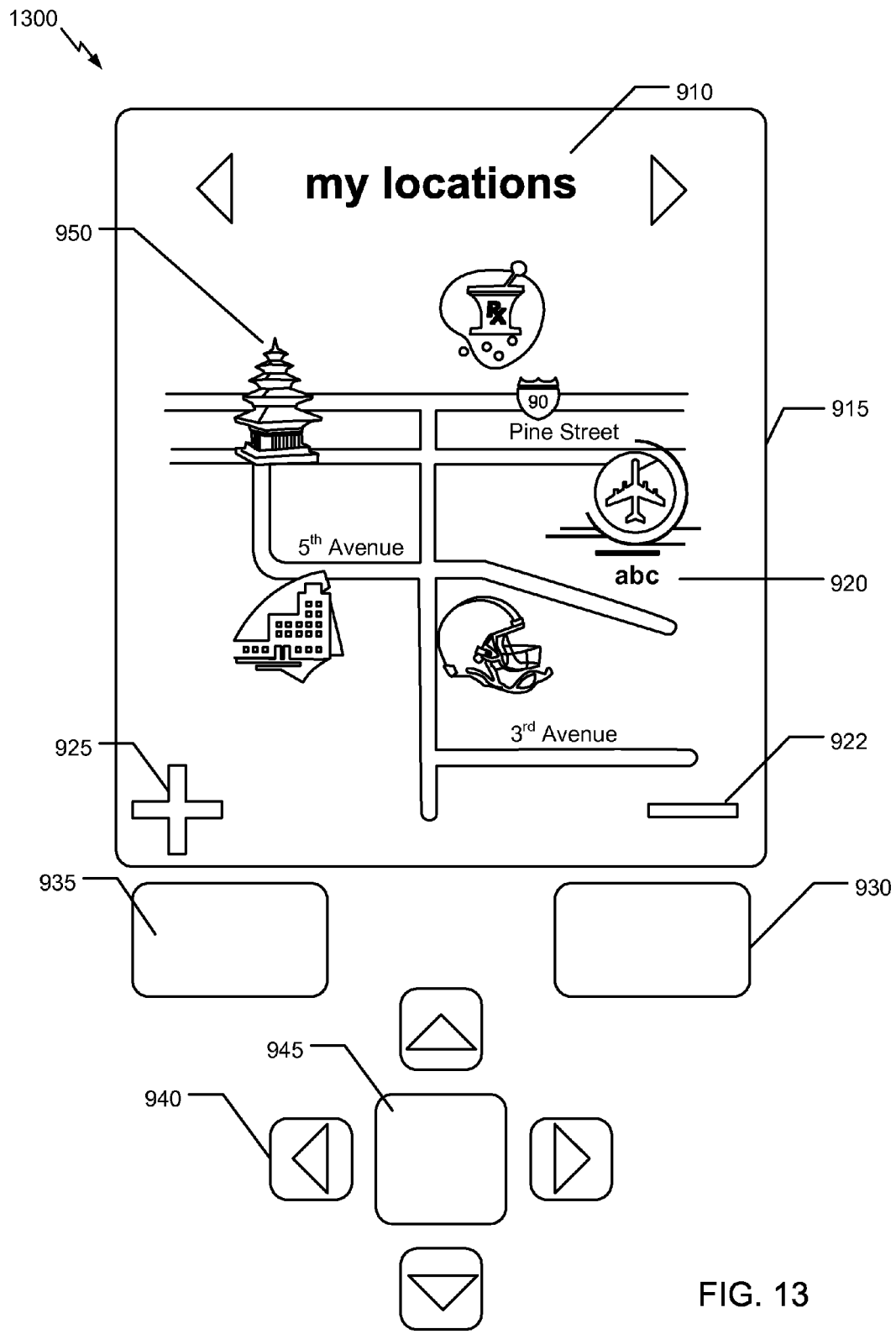
FIG. 13 depicts an exemplary user interface on a mobile communications device incorporating some of the embodiments disclosed herein.

Referring to FIG. 13, illustrated is an exemplary user interface 1300 that may be implemented on a mobile communications device, providing a location map with personal points of interest and contacts. The display may include a title area 910 that indicates that the current type of user interface currently presented is "my locations." Various location icons or artifacts 950 may be presented in an approximate spatial or geographic fashion on the display. Other embodiments may use thumbnails or other graphic indicators as desired. Some points of contact 920 may be presented with artifacts tagged with user IDs or other means of identifying a data object within a limited display area. For example, artifact 920 may be identified with a three letter acronym or initials of a contact.

As explained above, the user may navigate through the display by selecting the navigation buttons 940. For example, selection of left and right navigation buttons may scroll through different categories of locations such as those limited to a particular geographic range. Navigating with the up and down buttons may move the active display area to upper and lower levels of hierarchy. For example, a current active area may be the activity icon area 917. By pressing the up arrow button, the active area may be shifted to the primary subject area 910, which in the figure indicates "my locations." The user may then select the left or right navigation buttons to change the subject area, for example to "my things." Further active areas may be provided to indicate whether the current display indicates a particular geographic range, locations related only to contacts, entertainment locations, or other categories.

When the active area is the icon or artifact area, the user may select to zoom in or out by pressing the "+" or "−" zoom soft keys, upon which closer or farther zooming levels of the geographic features on the map may be provided on the display area 915. When a user presses the "−" zoom out button, the field of view may be expanded to include a larger mapping area. Likewise, if the zoom "+" button is selected, the field of view may zoom in to expand the mapping view. The user's desired points of contact may be represented on the display in accordance with their relative locations on the respective mapping views. As described above with respect to FIG. 18, the bounds of the location map may restrict which data objects are displayed thereon, for example, such that only data objects associated with locations displayable within the location map's viewing range are displayed thereon. Accordingly, in the example of FIG. 13, the displayable portion of the spatial dimension is restricted by the spatial point of origin that the location map is centered around, along with the zoom-level or the location-range being displayed.

In a further embodiment, location maps may be created and modified via a website and may be uploaded via the internet. For example, a web-based service may provide access to a user account associated with the mobile communication device. The service may authenticate a user and provide the user with various account management functions. The user may further be able to create and modify location information using the web service. Address, points of interest, and other location information may further be added to contacts and activities and placed along a location map provided by the website. Once the user has created or modified location map information on the website, an over-the-airwaves download may provide the information to the handset, thus updating the new information on the handset.

As the user navigates through the location map on the mobile device by selecting a zoom level, the user may select a contact or group by highlighting the contact or group. In one embodiment, by then clicking on the OK button, the people within the viewed spatial frame of reference may be selected. The interface may further provide details of the selected data object. For example, the display may indicate the names and contact information associated with the selected data object. The display may also indicate actions that may be selected by the user for the selected data object. Such actions may include, for example, updating the contact details, inviting the contacts, or deleting the event. In an embodiment, a location map wizard may be provided to facilitate intuitive and efficient creation of new data objects (e.g., events, activities, contacts and groups) and initiating actions with them. By further progressing through a wizard, various activities such as making calls, sharing information, initiating games, and the like may be commenced or scheduled.

In another embodiment, the location map view may also provide a "traversed route" and a "planned route" along with a destination. Such a view may be provided from the perspective of the user and provide a top down view or a user centric view. This is a representation of the most updated location, in conjunction with the location update history (past locations or route) and planned future location or route. Such a traversed route or planned route view can be helpful for a user in dispatch scenarios (e.g. trucks, taxicabs, etc.) when re-routing is needed.

In other embodiments, filters may be provided to provide context to aid a user in finding and managing information on the mobile communications device. For example, in one embodiment a voice-call filter may be provided for voice-call events. The voice-call filter may provide a temporal call history that includes a listing of incoming and outgoing calls, ordered chronologically by the time and date received. Each phone call may further include a representation of the social proximity of the users and/or groups involved in the call. Accordingly, a degree of relation between a time in a point of origin for a query, such as a current time, can be compared with the time from the data objects, which in this case are phone calls. Thereby, the user can view artifacts (e.g., pictures of callees, etc.) on a display representative of phone calls received within a given time range, or a given degree-range in the temporal dimension. The displayed artifacts can be further restricted such that only callers satisfying a social parameter of the query are displayed (e.g., only display calls from friends and family, etc.), and can be further restricted such that only callers satisfying a spatial parameter (e.g., from callers in a particular location region, etc.) of the query are displayed.

Similarly, filters may be provided for other types of data objects such as a notes filter, a pictures and videos filter, a games filter, a music filter, and the like. Such filters may provide further contextual filtering based on the specific types of activities. For example, a picture filter may provide a list of photo files sorted by categories such as location, contact, or associated activity. The photo filter may further include a representation of the social proximity of the contacts associated with the photo.

In further embodiments, containers may be provided for collecting and organizing information on the mobile communications device. In one embodiment, four main containers may be provided for people, places, things and settings. A people container may include contacts and groups that are arranged alphabetically and in a radial fashion according to social proximity Such an arrangement may thus include "closer circles" and "distant circles." The user may control and navigate through the interface using the navigation methods described above. A number of examples with regard to how different 'containers' can be used to exchange information between different socially networked contacts is described below with respect to FIGS. 22A-J

In an embodiment, when a user is adding a new data object (e.g., a new contact and/or a group), the user interface may provide a mechanism to order them by social proximity. Such a mechanism may include providing a wizard as described above. Furthermore, various categories of social proximity may be used. In one non-limiting example, social proximity types may comprise closest, closer, not-so-close, and distant. A list of social proximity types may be expanded to provide more options. For example, the list can be expanded to include family, friends, friend-of-a-friend, and the like. Alternatively, each category in the list may include subcategories. For example, the category of family may be further subdivided into parents, siblings, and in-laws. Any number and combination of categories may be used to represent the social categories that are important to the user of the mobile communications device.

In order to facilitate more efficient selection, entry and management of information, in one embodiment a soft key or other indication may provide a simple means of cycling through the various social proximity options for a selected contact or group. For example, selection of a "distance" indicator on a contact or and group may cause the contact or group to move outward from the center, indicating a more "distant" social proximity.

In another embodiment, a spatial container may be provided for places or locations that are shared between users and groups. Places may be represented as aliases that may have properties of latitude and longitude and/or point-of-interest data. Places may be initiated or modified via a wizard, as described above. Places may also be initiated or modified via a corresponding website via a user account associated with the mobile communications device. Once a place has been added or updated, the aliases can be downloaded over-the-air to the mobile communications device. The website may also provide the option for the user to share items with other users. Once the places are downloaded to the user's mobile communications device, the mobile communications device may map out the location spatially in context as described above. In this manner, a given data object (e.g., an event, a contact, a multimedia file, etc.) can become associated with a particular location which can then be used to determine a degree of relationship to a spatial parameter of a query such that data objects satisfying the spatial parameter of the query are displayed to the user. In an embodiment, places may be arranged spirally on the display, indicating the date/time that the place was added, and controllable via the above described navigation.

A "things" container may include data objects such as pictures, music, videos, and notes that can be shared between users and groups. The things container may also contain games that are played between users and groups. Things may be initiated or modified via a wizard, as described above. Things may also be initiated or modified via a corresponding website via a user account associated with the mobile communications device. Once a thing has been added or updated, the aliases can be downloaded over-the-air to the mobile communications device. The website may also provide the option for the user to share items with other users. Once the items are downloaded to the user's mobile communications device, the mobile communications device may map out the location spatially in context as described above. In an embodiment, things may be arranged spirally on the display, indicating the date/time that the things (e.g., places, multimedia files such as pictures, music, etc.) were added, and controllable via the above described navigation.

Figure 14:
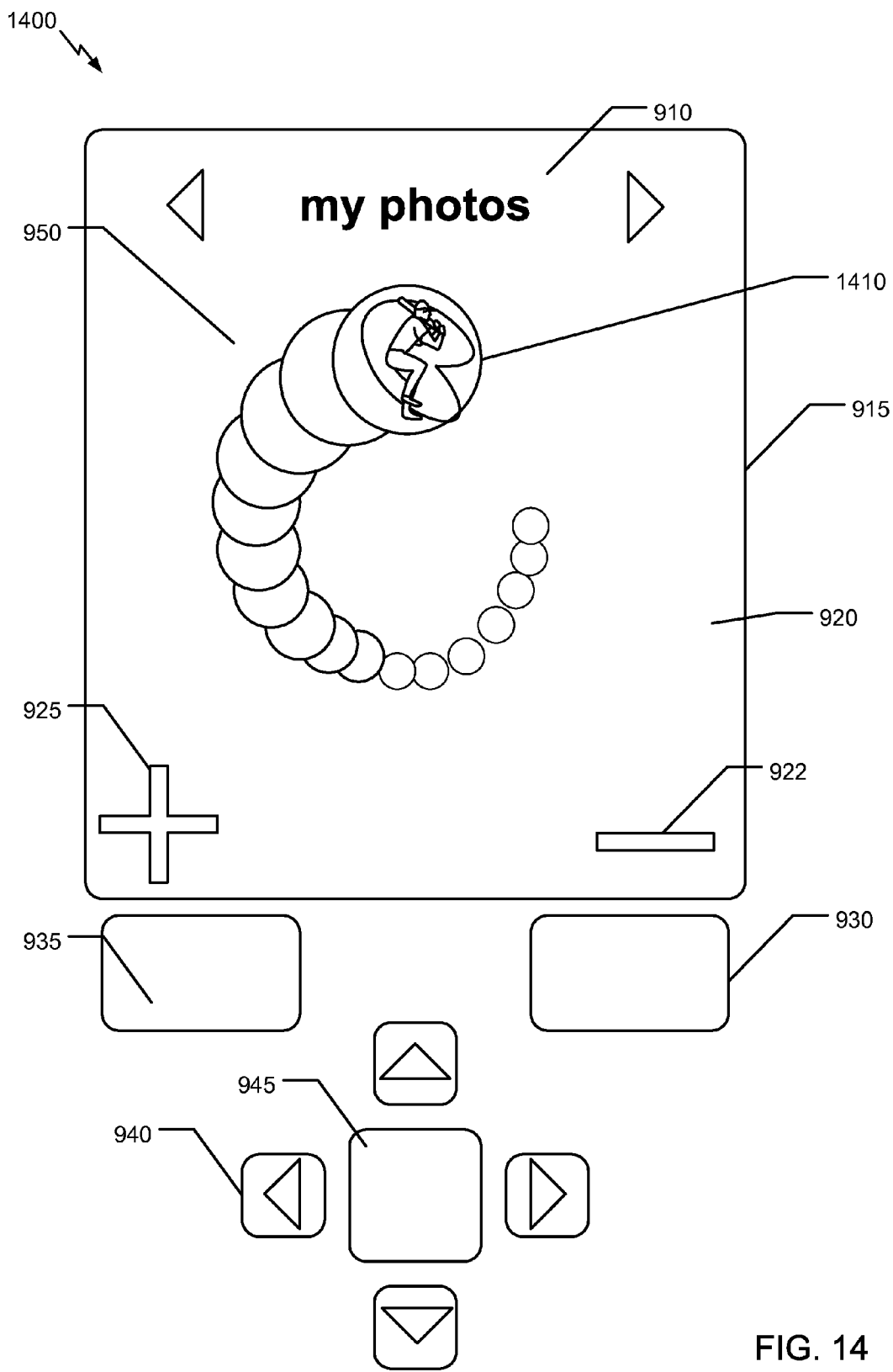
FIG. 14 depicts an exemplary user interface on a mobile communications device incorporating some of the embodiments disclosed herein.

Referring to FIG. 14, illustrated is an example photo container provided on display 915. A thumbnail or other representation of a photo object is indicated in artifact 1410. In the example shown, the photo objects are arranged spirally on the display, indicating the date/time that the photo was added.

A settings container may include settings for volume, modes, preferences, and the like. Settings may be arranged spirally on the device's display, showing changes in amplitude, frequency and time. Navigation and control may be provided using the above described navigation.

Figure 15A:
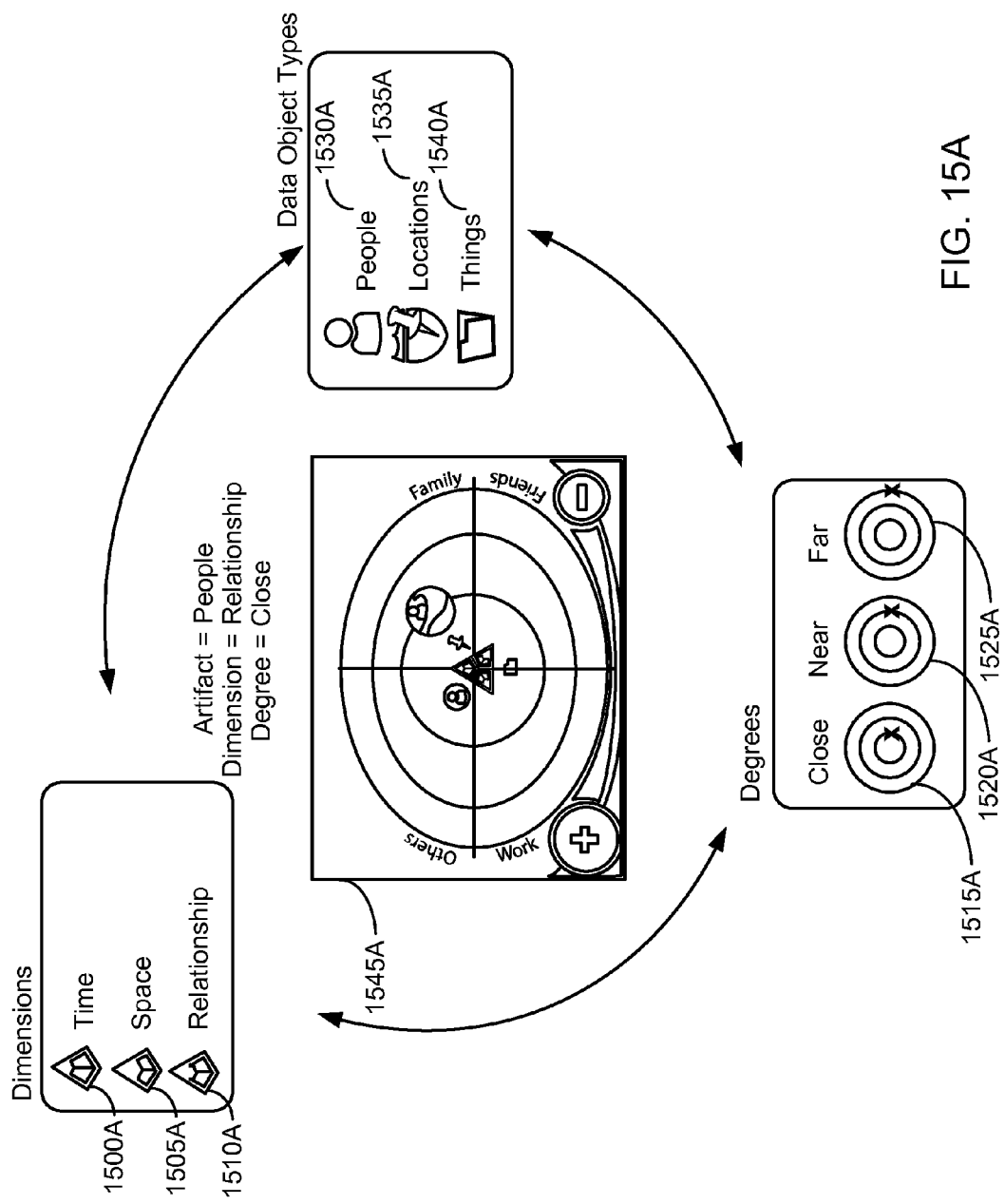
FIGS. 15A through 15C illustrate examples of the visual representation for particular sets of data objects in accordance with embodiments of the invention.
Figure 15B:
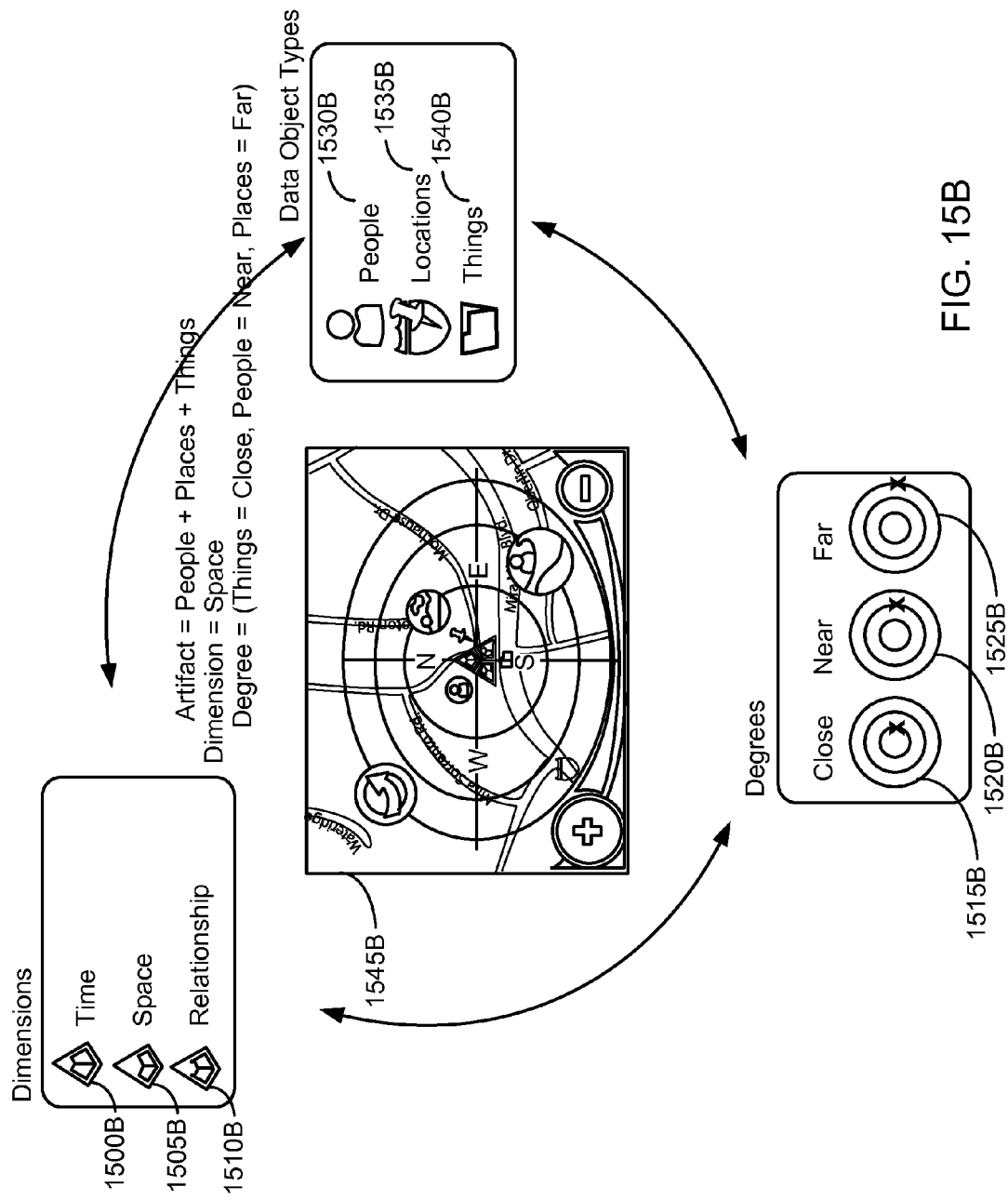
Figure 15C:
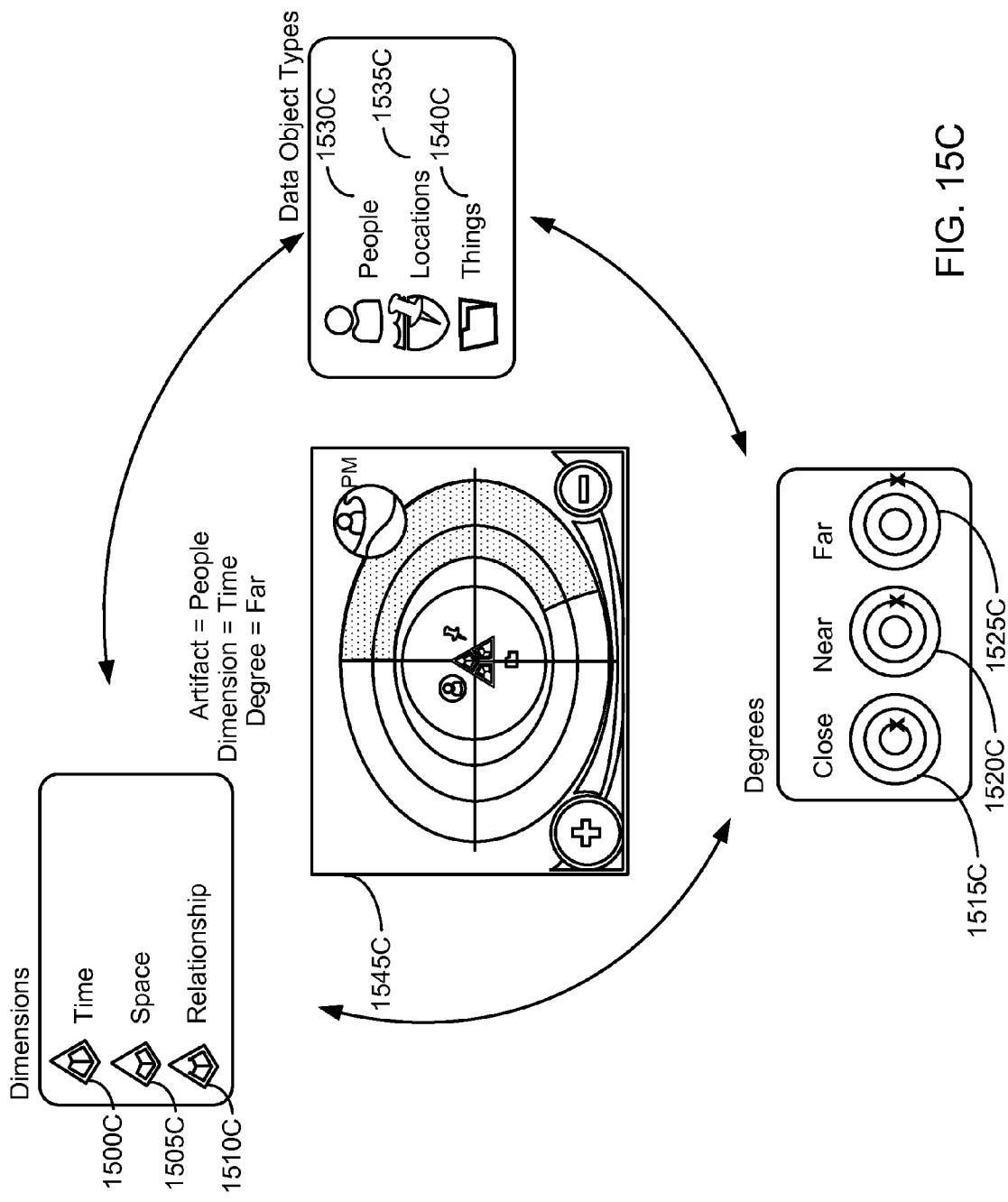

FIGS. 15A through 15C illustrate examples of the visual representation for particular sets of data objects in accordance with embodiments of the invention. Each of FIGS. 15A through 15C illustrate a visual representation with a different 'dominant' dimension among the spatial, social and temporal dimensions. In particular, FIG. 15A illustrates the visual representation of the set of data objects with the social dimension as dominant, FIG. 15B illustrates the visual representation of the set of data objects with the spatial dimension as dominant and FIG. 15C illustrates the visual representation of the set of data objects with the temporal dimension as dominant.

Referring to FIG. 15A, zoom-indicators 1500A, 1505A and 1510A indicate the current 'zoom' of a display 1545A for a set of data objects. In particular, the fill-level of the pyramids of the zoom-indicators 1500A, 1505A and 1510A indicate the manner in which the set of data objects are being filtered in the temporal, spatial and social dimensions, respectively. For example, a completely full pyramid indicates a full-zoom, such that a relatively narrow time, space or social relationship will satisfy the requirements for being displayed in the display 1545A, whereas an empty pyramid means that a particular dimension is 'zoomed-out', such that any value for that dimension will satisfy the display requirements. Likewise, an intervening level of 'fill' indicates an intermediate level of zoom. Accordingly, while the display 1545A primarily shows social relationships of the displayed data objects, it will be appreciated that any data objects displayed in the display 1545A also satisfy the temporal and/or spatial requirements which corresponds to the level of zoom as indicated by the fill of the periods. Accordingly, if the temporal zoom requires a time period corresponding to 'last week' be displayed, and the spatial zoom requires the user's current city to be displayed, then a social contact that was out of town last week would not be displayed irrespective of how the contact is to the user.

Still referring to FIG. 15A, degree indicators 1515A, 1520A and 1525A indicate how different degrees of relationship in the display 1545A for the social dimension are displayed, such that socially close data objects are displayed in an inner circle of the display 1545A, socially near data objects are displayed in a middle circle of the display 1545A and socially far data objects are displayed in an outer circle of the display 1545A. Data-object type indicators 1530A, 1535A and 1540A designate which types of data objects the user can select for display, with FIG. 15A showing people, locations and/or things as available data objects that are displayable on the display 1545A. In FIG. 15A, it may be assumed that the user has selected people (i.e., the user's socially networked contacts) as the set of data objects to be displayed, that the user has selected the social dimension as dominant and that the user selects only close-relationships to be displayed via degree indicator 1515A.

Accordingly, the display 1545A shows, in this example, four quadrants of contacts corresponding to 'work', 'friends', 'family' and 'others'. Because the user has indicated only close-relationships be displayed, and close data objects are displayed in the inner circle, only contacts in the user's inner circle are shown in display 1545A. Specifically, one close work-contact and one close family contact are shown in the display 1545A, with each displayed contact represented with a different picture or artifact (e.g., having different visual attributes, such as size, etc. that affect their prominence in the display 1545A). From the display 1545A shown in FIG. 15A, it will be appreciated that the user can navigate to different display criteria within the dominant social dimension (or 'social map'), or can switch the dominant dimension to the spatial or temporal dimension.

Referring to FIG. 15B, zoom-indicators 1500B, 1505B and 1510B indicate the current 'zoom' of a display 1545B for a set of data objects with the spatial dimension set as dominant In particular, as in FIG. 15A, the fill-level of the pyramids of the zoom-indicators 1500B, 1505B and 1510B indicate the manner in which the set of data objects are being filtered in the temporal, spatial and social dimensions, respectively.

Still referring to FIG. 15B, degree indicators 1515B, 1520B and 1525B indicate how different degrees of relationship in the display 1545B for the spatial dimension are displayed, such that spatially close data objects are displayed in an inner circle of the display 1545B, spatially near data objects are displayed in a middle circle of the display 1545B and spatially far data objects are displayed in an outer circle of the display 1545B. Data-object type indicators 1530B, 1535B and 1540B designate which types of data objects the user can select for display, with FIG. 15B showing people, locations and/or things as available data objects that are displayable on the display 1545B. In FIG. 15B, it may be assumed that the user has selected each of people, locations and things as the set of data objects to be displayed, that the user has selected the spatial dimension as dominant and that the user selects only close-relationships to be displayed via degree indicator for 'thing' data objects, only near-relationships to be displayed for 'people' data objects and only far-relationships to be displayed for 'places' data objects.

Accordingly, the display 1545B shows, in this example, four quadrants of locations corresponding to northeast (NE), northwest (NW), southeast (SE) and southwest (SW), relative to a point of origin corresponding to a location that the user inputs along with the query (e.g., such as the user's current location, a location the user is traveling to, etc.). Overlaid on the display 1545B is a street-map so that the user can better interpret the locations of the data objects displayed therein. Because the user has indicated only close-relationships for 'thing' data objects be displayed, and close data objects are displayed in the inner circle, any spatially close 'thing' data objects are shown in the user's inner circle of the display 1545B. Further, because the user has indicated only near-relationships for 'people' data objects be displayed, and near data objects are displayed in the middle circle, any spatially near 'people' data objects are shown in the user's middle circle of the display 1545B. Further, because the user has indicated only far-relationships for 'place' data objects be displayed, and far data objects are displayed in the outer circle, any spatially far 'place' data objects are shown in the user's outer circle of the display 1545B.

Specifically, in FIG. 15B, one close 'thing' data object is shown in the inner circle of the display 1545B, one near 'people' data object are shown in the display 1545B and one far 'place' data object are shown in the display 1545B. Further, each data object shown in the display 1545B is represented with a different picture or artifact (e.g., having different visual attributes, such as size, etc. that affect their prominence in the display 1545B). From the display 1545B shown in FIG. 15B, it will be appreciated that the user can navigate to different display criteria within the dominant spatial dimension (or 'location map'), or can switch the dominant dimension to the social or temporal dimension.

Referring to FIG. 15C, zoom-indicators 1500C, 1505C and 1510C indicate the current 'zoom' of a display 1545C for a set of data objects with the temporal dimension set as dominant In particular, as in FIGS. 15A and 15B, the fill-level of the pyramids of the zoom-indicators 1500C, 1505C and 1510C indicate the manner in which the set of data objects are being filtered in the temporal, spatial and social dimensions, respectively.

Still referring to FIG. 15C, degree indicators 1515C, 1520C and 1525C indicate how different degrees of relationship in the display 1545C for the temporal dimension are displayed, such that temporally close data objects (e.g., close in the past, current, or close in the future, etc.) are displayed in an inner circle of the display 1545C, temporally near data objects (e.g., near in the past, near in the future, etc.) are displayed in a middle circle of the display 1545C and temporally far data objects (e.g., far in the past, far in the future, etc.) are displayed in an outer circle of the display 1545C. Data-object type indicators 1530C, 1535C and 1540C designate which types of data objects the user can select for display, with FIG. 15C showing people, locations and/or things as available data objects that are displayable on the display 1545C. In FIG. 15C, it may be assumed that the user has selected people as the set of data objects to be displayed, that the user has selected the temporal dimension as dominant and that the user selects only far-relationships to be displayed for 'people' data objects.

Accordingly, the display 1545C shows, in this example, four quadrants of time relative to a point of origin corresponding to a time that the user inputs along with the query (e.g., such as the current time.). In an example, the four quadrants can represent different portions of time for a given radial distance from the point of origin. For example, the quadrants can represent seasons (e.g., spring, summer, fall and winter) whereas the distance from the point of origin, or center, of the display 1545C can correspond to years. Alternatively, the quadrants can represent days of the week (e.g., Monday/Tuesday, Wednesday/Thursday, etc.) whereas the distance from the point of origin can correspond to a number of weeks (e.g., 1, 2, 3, etc.). Because the user has indicated only far-relationships for 'people' data objects be displayed, and far data objects are displayed in the outer circle, any temporally far 'people' data objects is shown in the user's outer circle of the display 1545C. In an example, a 'people' data object, or socially networked contact of the user, can have a far temporal relationship with the user if the contact has not communicated with the user in a long time (e.g., the contact died many years ago, etc.), or is expected to be out of communication for a long time (e.g., the contact is on a 5 year mission to mars, etc.).

Specifically, in FIG. 15C, one far 'people' data object is shown in the outer circle of the display 1545C. From the display 1545C shown in FIG. 15C, it will be appreciated that the user can navigate to different display criteria within the dominant temporal dimension (or 'time map' or 'timeline'), or can switch the dominant dimension to the social or spatial dimension.

Figure 16:
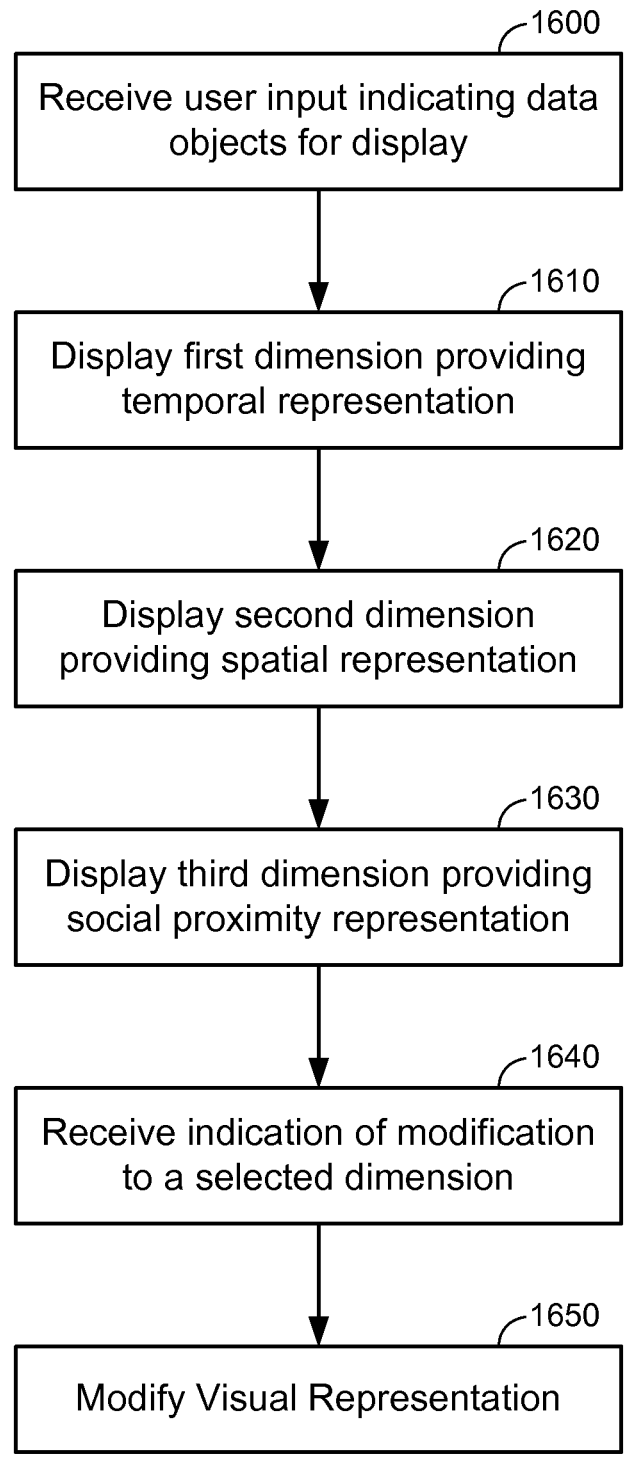
FIG. 16 depicts an exemplary process incorporating some of the embodiments disclosed herein.

Referring now to FIG. 16, illustrated is an exemplary process for displaying a visual representation of data objects on a mobile communications device in accordance with an embodiment of the invention. In 1600, a device may receive inputs from the user, for example, a query with social, temporal and spatial parameters to control the manner by which a given set of data objects (e.g., which can also be indicated in the query) are displayed to the user. As discussed above, the inputs may be provided by another system for receiving inputs, in which the system is associated with the mobile user's account. The inputs may also be provided directly by the user on the mobile device. Alternatively, the inputs may be retrieved from the device's memory if previously received. In an example, the inputs from the user may correspond to a query related to the visual representation of one or more data objects, where the query includes spatial, social and temporal parameters that affect which of the data objects are displayed in the visual representation. The query can further include a point of origin against which attributes of the data objects are compared against in determining whether to display the data objects, and can further include an indication of which dimension is to be dominant (e.g., to result in a visual representation as shown in FIG. 15A, FIG. 15B or FIG. 15C). In 1610, a first dimension may be displayed that provides a temporal representation of the inputs received (e.g., as in FIG. 15C, where the temporal dimension is dominant). For example, in 1610, the device can determine which data objects satisfy the temporal parameter of the query (e.g., if the temporal parameter indicates that the user is interested in data objects within the next week from a current time, data objects outside of this time frame are excluded from consideration, etc.).

In 1620, a second dimension may be displayed that provides a spatial representation of the received inputs (e.g., as in FIG. 15B, where the spatial dimension is dominant). For example, in 1620, the device can determine which data objects satisfy the spatial parameter of the query (e.g., if the spatial parameter indicates that the user is interested in data objects within two miles from his/her current location, data objects outside of this location range are excluded from the display, etc.). In a further example, the device need only consider the locations of the data objects during the time-range associated with the temporal parameter (e.g., if the spatial parameter corresponds to San Francisco and the temporal parameter corresponds to a current time, then a data object of an event taking place in San Francisco a year in the future would not be displayed).

In 1630, a third dimension may be displayed that provides a social proximity representation of the received inputs (e.g., as in FIG. 15A, where the social dimension is dominant). For example, in 1630, the device can determine which data objects satisfy the social parameter of the query (e.g., if the social parameter indicates that the user is interested in data objects of events that the user is interested in based on a user profile and/or socially networked contacts in the user's contact list, data objects not meeting these conditions are excluded from the display, etc.). As will be appreciated, once each dimension is displayed in 1610 through 1630, the resultant visual representation that displays one or more of the data objects can be displayed to the user (e.g., as a location map, an activity map, etc., with artifacts shown in the display to represent the data objects). While 1610, 1620 and 1630 show that each type of dominant dimension is selected in sequential fashion, it will be appreciated that the user could alternatively be satisfied with the first dimension set to dominance such that the user need not navigate to the other dominant dimensions as in 1620 and/or 1630.

In process 1640, the mobile communications device may receive an indication of that the user wishes to modify a selected dimension of the visual representation. For example, if the user wishes to modify the range or degrees of displayable dimensions from the initial query, the user selects the dimension to be modified in 1640.

For example, assume that a first soft key is assigned as a "zoom in" function for navigating through the selected or active axis, and a second soft key is assigned as a "zoom out" function. By configuring the soft keys, a user may zoom in and out which may result in updating the corresponding number of people in the displayed frame of reference. In this case, the indication received in 1640 may correspond to a selection, by the user, to zoom-in or zoom-out of one of the spatial, temporal or social dimensions. For example, if the visual representation is in the form of a location map, then when a user presses the zoom out soft key, the field of view may be expanded to include a wider field of view such that more locations are shown, and potentially more data objects are then displayed. Likewise, if the zoom "+" soft key is selected, the field of view may zoom in to expand the current view, which can exclude data objects that are no longer within the location range of the visual representation. After receiving the indication to modify one of the dimensions for the visual representation, the visual representation is modified in 1650 (e.g., to transition to another dominant dimension, to modify the parameters for satisfying the parameters of the query, etc.).

Figure 17:
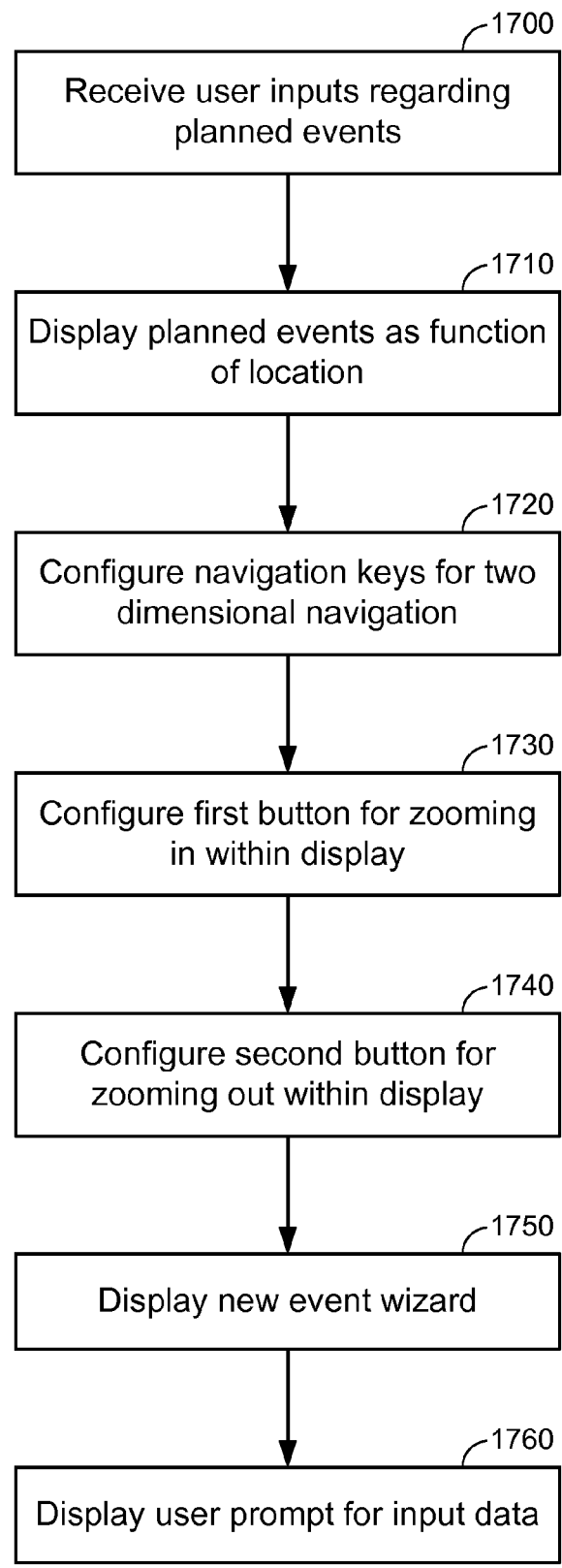
FIG. 17 depicts an exemplary process incorporating some of the embodiments disclosed herein.

Referring now to FIG. 17, illustrated is an exemplary process for displaying a user interface on a mobile communications device in accordance with some of the methods disclosed herein. In 1700, a device may receive inputs from the user regarding data objects, which in this embodiment correspond to planned events. As discussed above, the inputs may be provided by another system for receiving inputs, in which the system is associated with the mobile user's account. The inputs may also be provided directly by the user on the mobile device. Alternatively, the inputs may be retrieved from the device's memory if previously received. In 1710, planned events are displayed as a function of the location of the events. As discussed above, other data objects and representations may be indicated by a location. Alternatively, the data objects may be indicated according to other qualities disclosed, such as social proximity and temporal distance. For example, the location representation can include indications on a location map. In various embodiments disclosed above, a location representation may comprise events situated on a two dimensional map.

In 1720, navigation keys for two dimensional navigation may be configured. As disclosed above, on a mobile communications device the up, down, left, and right keys may be used for such navigation. In 1730, a first button may be configured for zooming in within the display (e.g., which corresponds to narrowing the spatial dimension if the visual representation corresponds to a location map, narrowing the social dimension if the visual representation corresponds to a social map, etc.). In 1740, a second button is configured for zooming out within the display. By configuring the buttons for zooming, a user may zoom in and out which may result in updating the corresponding number of data objects (e.g., events) in the displayed frame of reference. When a user presses the zoom out button, the field of view may be expanded to include a wider field of view (e.g., which corresponds to expanding the spatial dimension if the visual representation corresponds to a location map, expanding the social dimension if the visual representation corresponds to a social map, etc.). Likewise, if the zoom in button is selected, the field of view may zoom in to expand the current view. In 1750 new events may be generated by displaying a new event wizard to facilitate intuitive creation of new activities and events. Such a wizard may provide a mechanism to select people/contacts, places/locations, data or media entities/things, and a time value. In 1760 the wizard may prompt the user for inputs. Through various menus and prompts, a user may, for example, select a person in a contact list, select a location, and select a time value that may indicate a "now" versus "later" choice.

Figure 19:
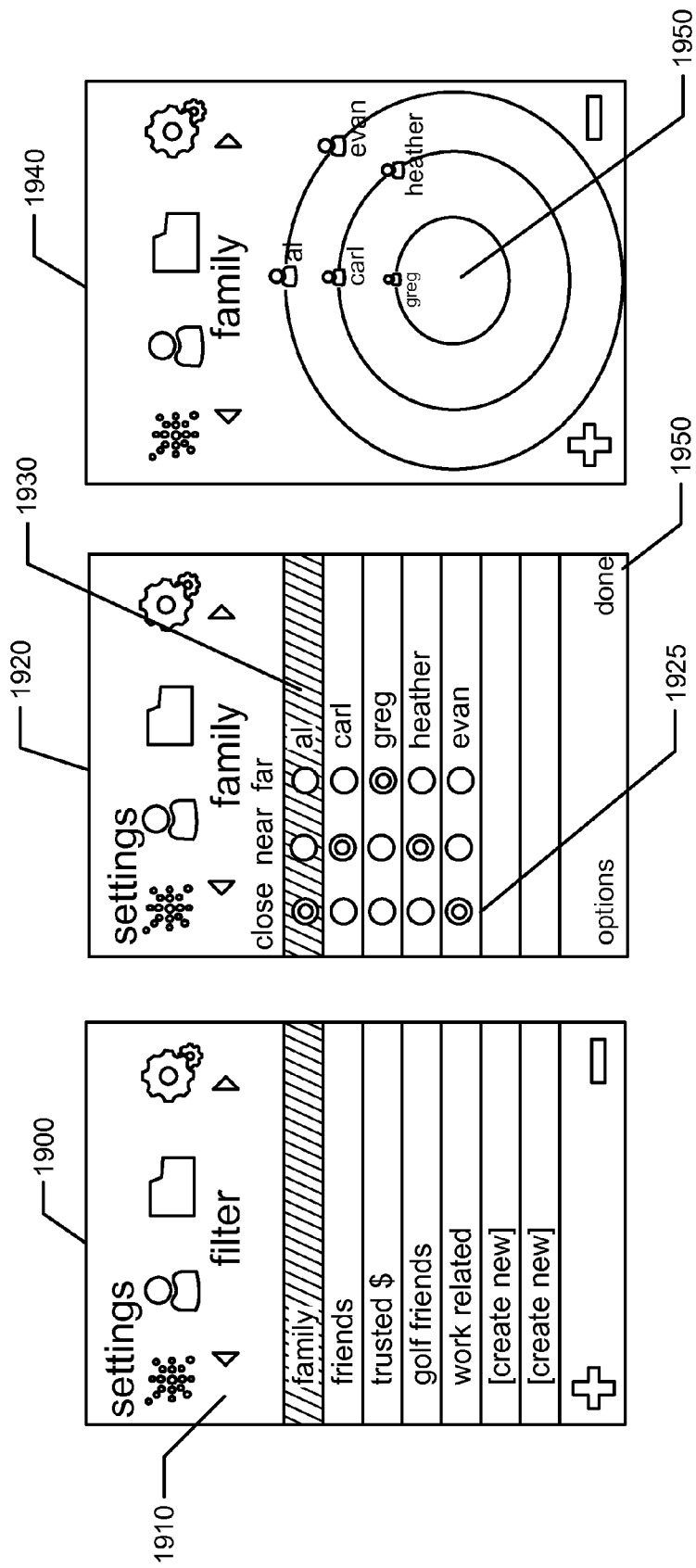
FIG. 19 depicts an exemplary user interface on a mobile communications device incorporating some of the embodiments disclosed herein.

Referring to FIG. 19, illustrated are exemplary displays depicting an embodiment of the invention. In particular, FIG. 19 illustrates a variation to the user interface and display illustrated and described above with respect to FIG. 15A, where the visual representation correspond to a social map. Display 1900 depicts a settings function in which a user may select various filters for viewing entry and/or editing. In this example the user has selected "family" 1910 as depicted by the highlighted area. Upon pressing an "enter" or "OK" button, the display 1920 may be instantiated, further depicting various contacts included in the "family" category. Furthermore, radio buttons 1925 may indicate the current social proximity settings for the contacts listed in the "family" filter. The user may highlight a particular contact, for example "al" 1930 depicted by the highlighted area. The user may modify the social proximity settings, shown as "close," "near," and "far" in this example.

In other words, in the embodiment of FIG. 19, display 1900 shows the social parameter for the user's query, whereby data objects having a family-relationship to the user satisfy the social parameter of the query. The data objects, which in this example correspond to socially networked contacts of the user, are illustrated at the display 1920. In particular, the display 1920 shows the data objects satisfying the social parameter of the user's family members, and further shows the degrees of social relation within the user's family (e.g., close, near and far, in this example).

The user may select "done" when editing is complete, whereupon display 1940 may be instantiated, depicting contacts in the "family" filter. The display 1940 depicts the contacts in the "family" filter situated along concentric circles 1950 indicating their respective social proximity settings. The smallest circle includes contact "greg" who was associated with a "far" social proximity setting. The mid-size circle includes contacts "carl" and "heather" who were associated with a "near" social proximity setting. The large circle includes contacts "al" and "evan" who were associated with a "close" social proximity setting. As can be seen the progressively larger circles indicate a closer social proximity setting, while the progressively smaller circles indicate a farther social proximity setting. In one embodiment, the user may configure the integrated zoom display to depict progressively larger circles to indicate a farther social proximity setting, and configuring the progressively smaller circles to indicate a farther social proximity setting.

In other words, the display 1940 corresponds to a social map whereby the social proximity of each of the user's family members is shown based on a distance to a center of the display at 1950, where the center of the display corresponds to the social point of origin for the query (e.g., the social point of origin in this case corresponding to the user him/herself).

Figure 20:
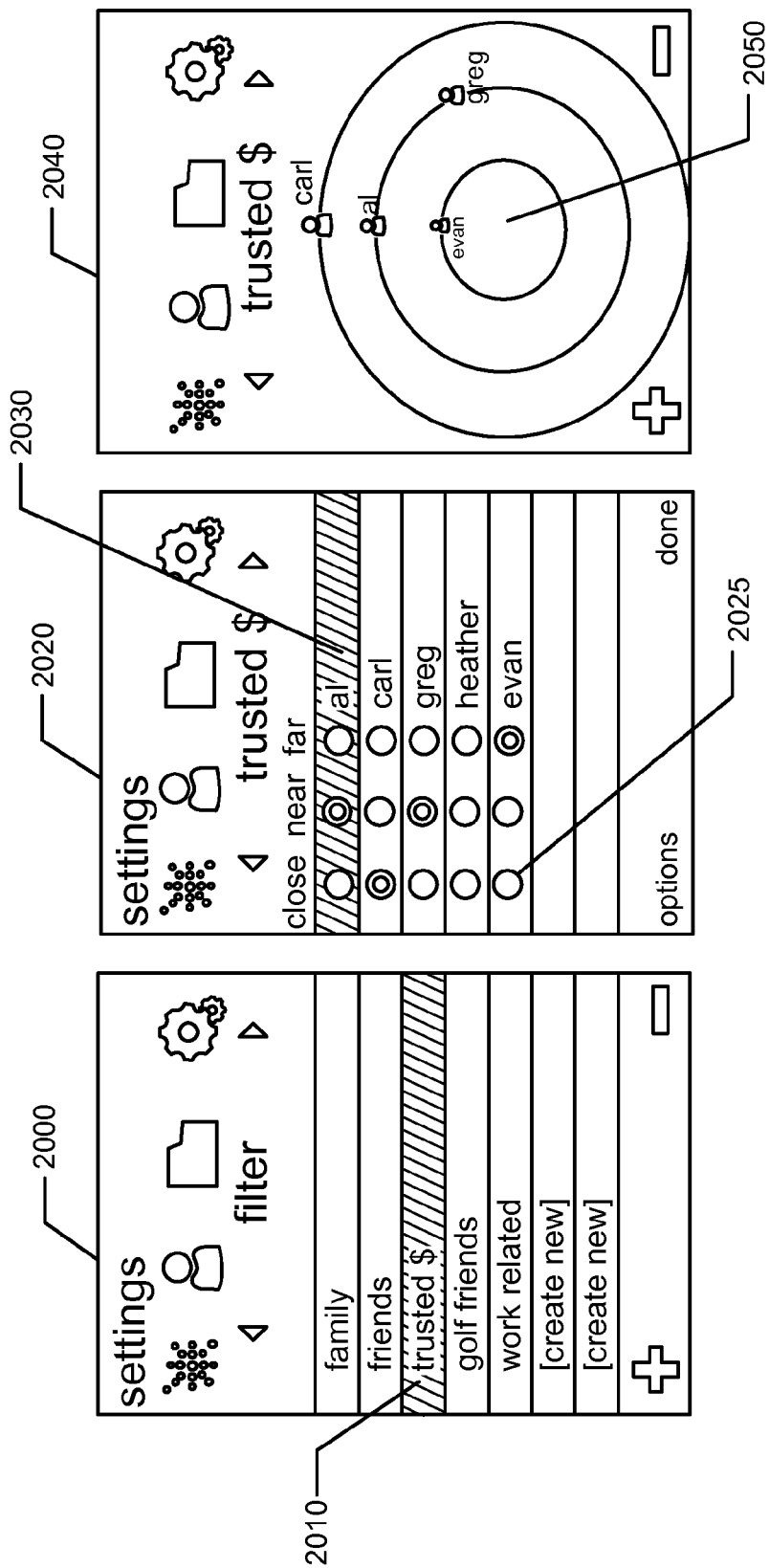
FIG. 20 depicts an exemplary user interface on a mobile communications device incorporating some of the embodiments disclosed herein.

Turning now to FIG. 20, illustrated are exemplary displays depicting another embodiment of the invention. In particular, FIG. 20 illustrates a variation to the user interface and display illustrated and described above with respect to FIG. 15A, where the visual representation correspond to a social map that is based on the user's trust level in his/her social contacts. Display 2000 depicts a settings function in which a user may select various filters for viewing, entry and/or editing. In this example the user has selected "trusted" 2010 as depicted by the highlighted area. Upon pressing an "enter" or "OK" button, the display 2020 may be instantiated, further depicting various contacts included in the "trusted" category. Furthermore, radio buttons 2025 may indicate the current social proximity settings for the contacts listed in the "trusted" filter. The user may highlight a particular contact, for example "al" 2030 depicted by the highlighted area. The user may modify the social proximity settings, shown as "close," "near," and "far" in this example.

In other words, in the embodiment of FIG. 20, display 2000 shows the social parameter for the user's query, whereby data objects (e.g., contacts) having a trusted-relationship to the user satisfy the social parameter of the query. The data objects, which in this example correspond to socially networked contacts of the user, are illustrated at the display 2020. In particular, the display 2020 shows the data objects satisfying the social parameter of the user's trusted contacts, and further shows the degrees of trust within the user's trusted contacts (e.g., close, near and far, in this example).

The user may select "done" when editing is complete, whereupon display 2040 may be instantiated, depicting contacts in the "trusted" filter. The display 2040 depicts the contacts in the "trusted" filter situated along concentric circles 2050 indicating their respective social proximity settings. The smallest circle includes contact "evan" who was associated with a "far" social proximity setting. The mid-size circle includes contacts "al" and "greg" who were associated with a "near" social proximity setting. The large circle includes contact "carl" who was associated with a "close" social proximity setting. Since contact "heather" was not assigned a trust setting, an associated icon is not depicted in display 2040 as can be seen the progressively larger circles indicate a closer social proximity setting, while the progressively smaller circles indicate a farther social proximity setting. In one embodiment, the user may configure the integrated zoom display to depict progressively larger circles to indicate a farther social proximity setting, and configuring the progressively smaller circles to indicate a farther social proximity setting.

In other words, the display 2040 corresponds to a social map whereby the social proximity of each of the user's trusted members is shown based on a distance to a center of the display at 2050 where the center of the display corresponds to the social point of origin for the query (e.g., the social point of origin in this case corresponding to the user him/herself).

It can also be seen that data objects such as contacts may have multiple social proximity setting associated with various "filters" or categories. For example, in FIGS. 19 and 20 contact "al" was associated with a "near" setting with respect to the "trust" filter and associated with a "close" setting with respect to the "family" filter. The ability to distinguish social proximity settings with respect to different contexts such as "family" and "trust" may enable a user to more closely approximate actual relationships and associated activities in the real world. For example, a user may not trust a family member with respect to financial transactions, and yet may prefer to closely associate with that family member with respect to social activities. The methods of the present disclosure may enable a user to depict such nuances in relationships and activities on a mobile device in order to provide a richer user experience that more closely resembles relationships and activities in the real world.

Figure 21:
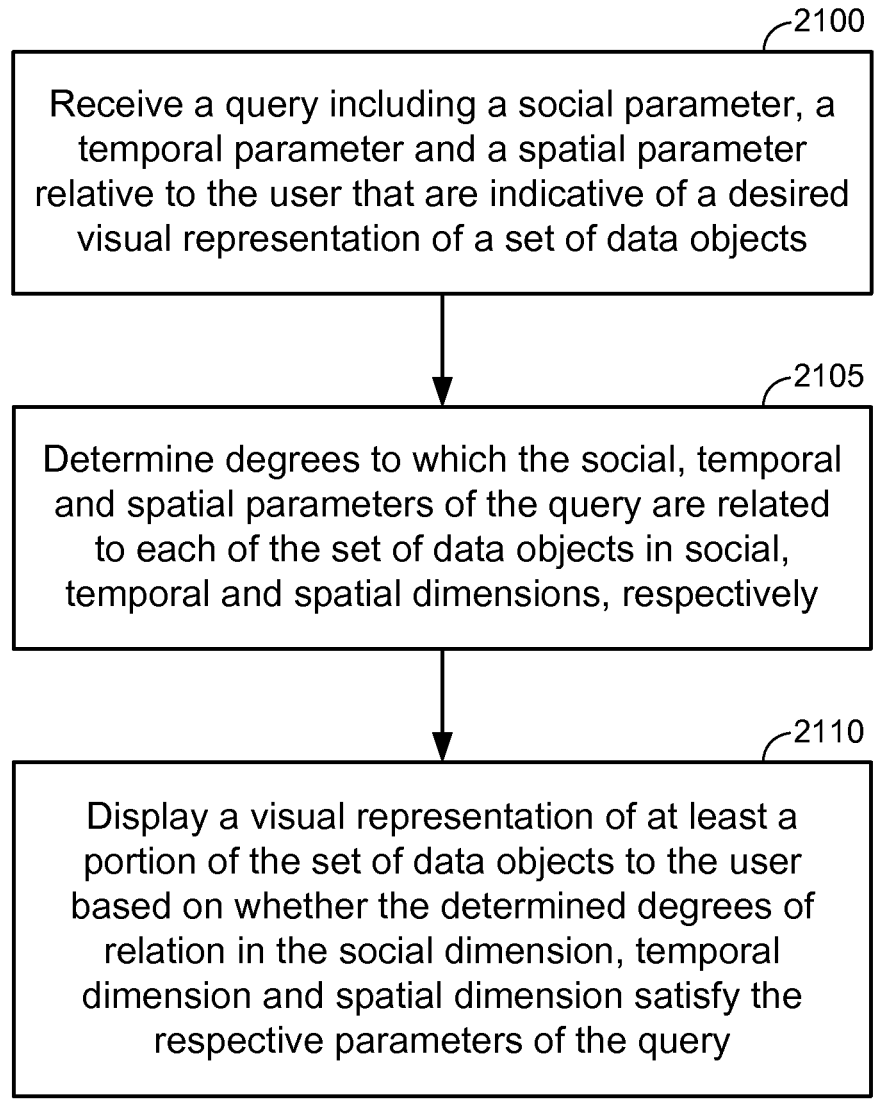
FIG. 21 illustrates a process by which one or more data objects belonging to a set of data objects can be displayed to a user in accordance with an embodiment of the invention.

FIG. 21 illustrates a process by which one or more data objects belonging to a set of data objects can be displayed to a user in accordance with an embodiment of the invention. Referring to FIG. 21, a query is received including a social parameter, a temporal parameter and a spatial parameter relative to the user that are indicative of a desired visual representation of a set of data objects, 2100. In an example, the query can be received at a mobile communications device belonging to a user from which the query originates. In an example, as discussed with respect to above embodiments, the data objects can correspond to events, activities, socially networked contacts, multimedia files and/or any other type of information that is classifiable in spatial, social and temporal terms.

For example, the query can specify a point of origin in spatial, temporal and social dimensions. In a specific example, the social point of origin may be an identity or subscriber profile for the user, the spatial point of origin may be the user's location and the temporal point of origin may be a time or time-range specified by the user. The spatial and temporal points of origin will typically be considered collectively, such that the user's spatial point of origin will be considered at the time or within the time-range of the temporal point of origin. For example, assume that the user is curious as to which his/her co-workers will be attending work on Tuesday, the social parameter of the query may be "my co-workers", the temporal parameter of the query may be "Tuesday" and the spatial parameter of the query may be "my work address".

Next, degrees to which the social, temporal and spatial parameters of the query are related to each of the set of data objects in social, temporal and spatial dimensions, respectively, are determined, 2105. For example, because the social parameter of the query related to "my co-workers", which is a designated of socially networked contacts, the user's communication device can contact the social networking server 174 and obtain the user's list of co-workers and can request the co-worker's calendar for Tuesday. In this case, assume the query is binary so that only contacts that perfectly match the query are displayed to the user. Thus, if the co-workers have no appointments on Tuesday the device may assume that the co-workers will be in the office, for example, and these co-workers can be displayed to the user, whereas co-workers scheduled to be away from the office are not displayed.

Next, the communication device displays a visual representation of at least a portion of the set of data objects to the user based on whether the determined degrees of relation in the social dimension, temporal dimension and spatial dimension satisfy the respective parameters of the query, 2110. In the example from above, this means the co-workers determined to be in the office on Tuesday are displayed to the user. The visual representation can be in the form of a social map, an activity map and/or a location map (e.g., centered around the office), in each case with only the co-workers expected to be in the office on Tuesday being displayed.

While not shown in FIG. 21, the user could shift the visual representation from 2110 to another day of the week (e.g., along the temporal axis or dimension), the user could narrow the visual representation from 2110 to show only certain co-workers (e.g., zooming in along the social axis or dimension), the user could expand the visual representation from 2110 to show any co-workers that will be in the office for that week (e.g., zooming out along the temporal axis or dimension), the user could expand the visual representation from 2110 to show any co-workers that will be at any of multiple office locations on Tuesday (e.g., zooming out along the spatial axis or dimension), and so on.

While FIG. 21 is described whereby the social parameter of the query specifies co-workers of the user, and the spatial parameter specifies an office, in another example the social parameter could specify friends of the user and the spatial parameter could specify a particular city. Further, while FIG. 21 has been described whereby the data objects correspond to socially networked contacts it will be readily appreciated that other embodiments can direct the general teachings of FIG. 21 to any type of data object, such as events, activities, multimedia files, etc.

While the attributes (e.g., location, time and/or social relationship) of data objects have been described above as 'static', such that a given data object maintains the same social relationship to other data objects and a given data object's location at a particular time is the same, it will be appreciated that other embodiments can be directed to dynamically updating one or more of these data object attributes. For example, if a user becomes closer friends to an acquaintance, the user can transition his/her social relationship to the data object representing the acquaintance to a closer social setting (e.g., by dragging the artifact representing the acquaintance from a 'near' or 'far' position to a 'close' position on the social map of FIG. 15A, for instance). Likewise, the user may have been told in person that his/her contact is not attending an event to which the contact RSVPed, and can remove the contact from a temporal or spatial map indicating the contact's attendance at the event. When a data object attribute changes, the data object can assume the privileges and/or permissions of its new attribute (e.g., notifications pertaining to the data object can achieve a higher or less prominence to the user, etc.).

While above-described embodiments of the invention have generally been directed to visually representing a set of data objects at a device operated by a particular user, other embodiments are directed to the exchange of data objects between users. Accordingly, FIGS. 22A-22J are directed to such an exchange from the perspective of the sender of the data object(s), and FIG. 23 is directed to a data object exchange from the perspective of a receiver or target of the data object(s).

Figure 22A:
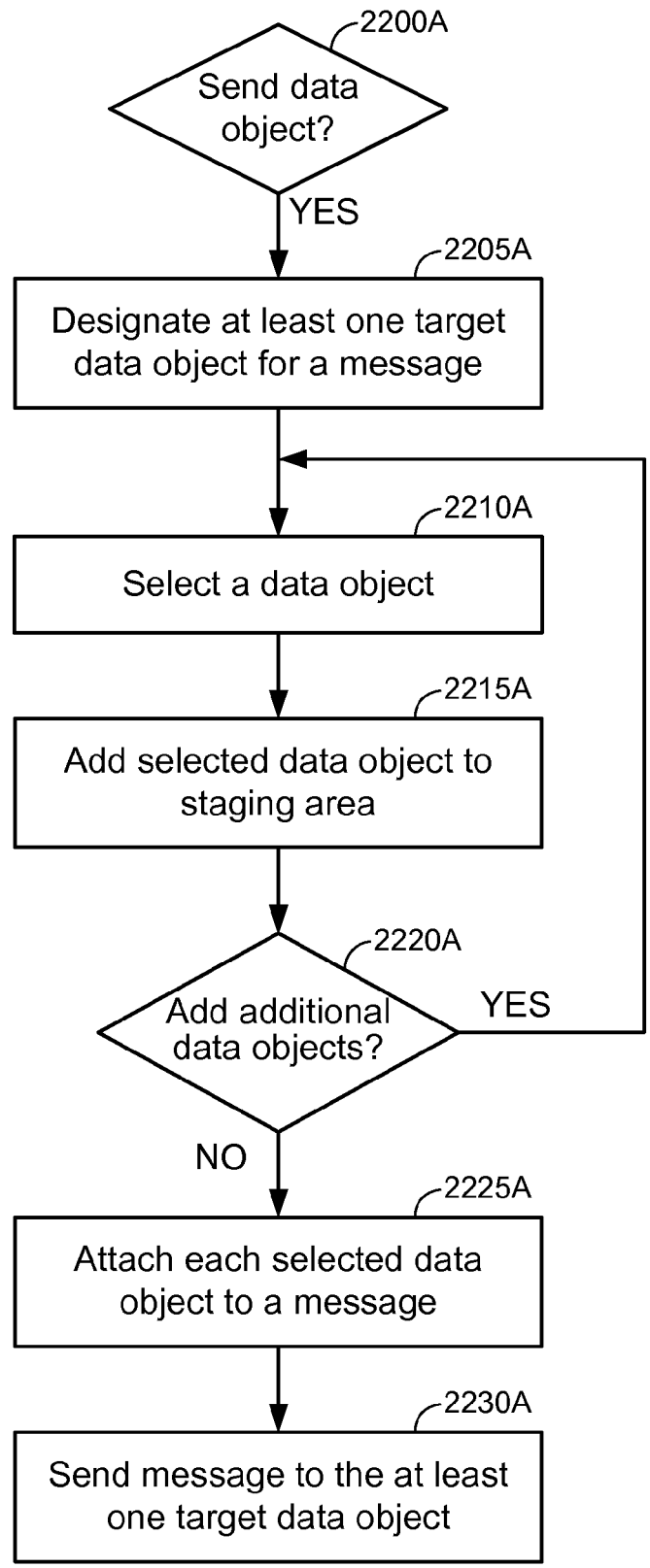
FIGS. 22A-22J are directed to an exchange from the perspective of a sender of data objects in accordance with an embodiment of the invention.
Figure 23:
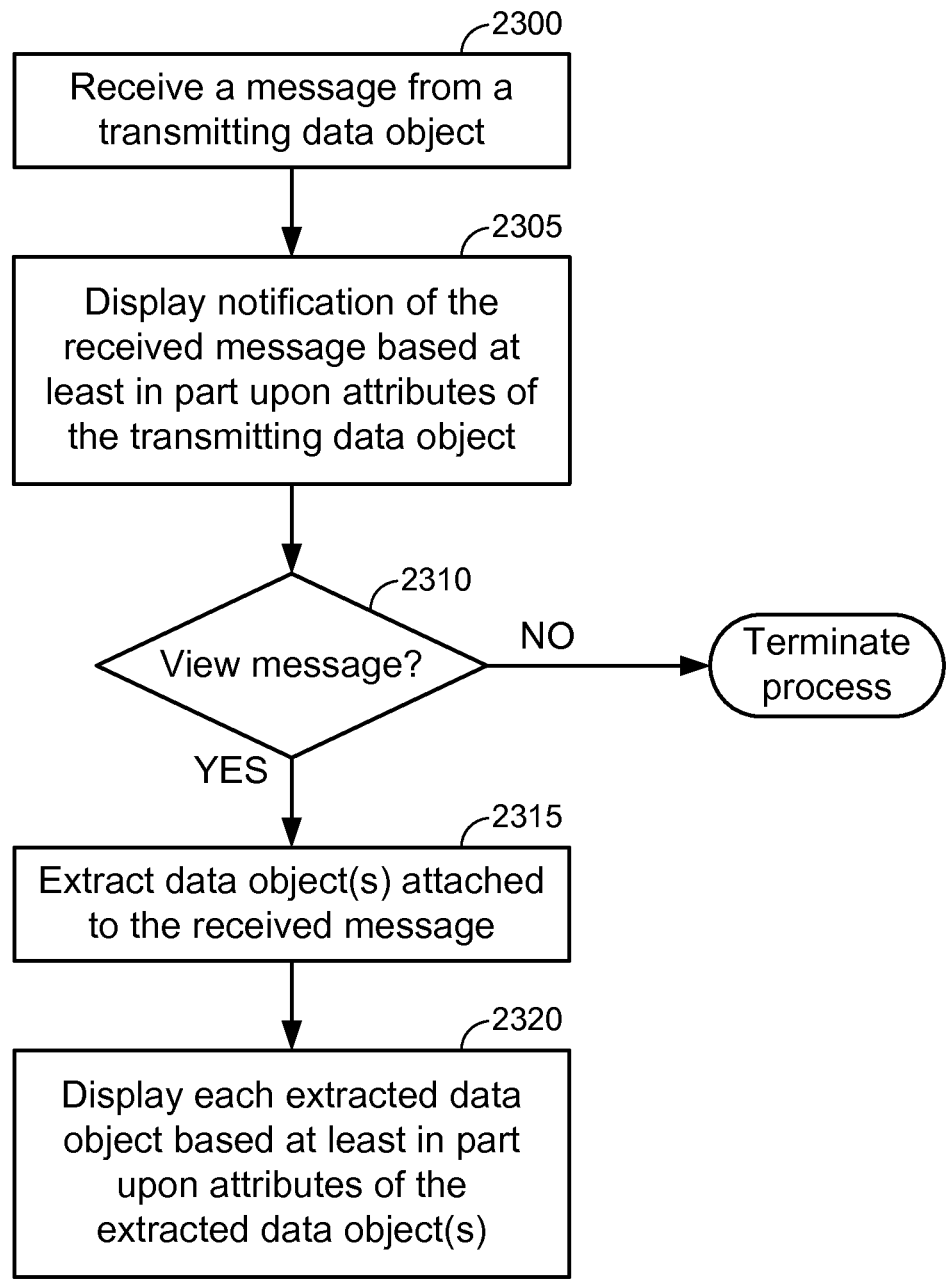
FIG. 23 is directed to a data object exchange from the perspective of a receiver or target of data objects in accordance with an embodiment of the invention.

Referring to FIG. 22A, assume that a given user determines to send one or more data objects to at least one other user, 2200A. Accordingly, the given user designates at least one target data object to which the data object(s) are to be sent as attachment(s) to a message, 2205A. In an example, the each target data object will typically correspond to a socially networked contact of the user.

Next, a process that is potentially iterative begins whereby the given user browses through its available data objects and selects a data object to send to the at least one target data object, 2210A. After selecting the data object, the given user requests that the selected data object be added to a staging area that corresponds to the message being composed for the at least one target data object. In 2220A, the given user determines whether to add another data object to the staging area. If the given user determines to add another data object to the staging area in 2220A, the process returns to 2210A and the given user browses for another data object. Otherwise, if the given user determines not to add another data object to the staging area in 2220A, each data object added to the staging area is attached to a message, 2225A, and the device operated by the given user then sends the message with any attached data objects to the at least one target data object, 2230A.

Figure 22B:
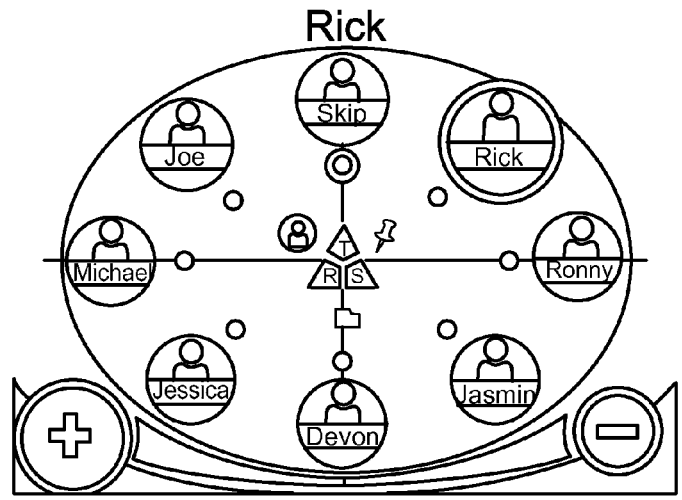
Figure 22C:
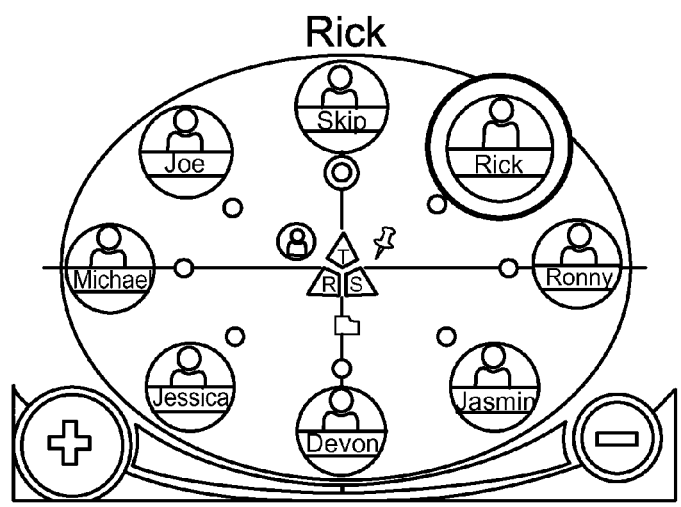
Figure 22D:
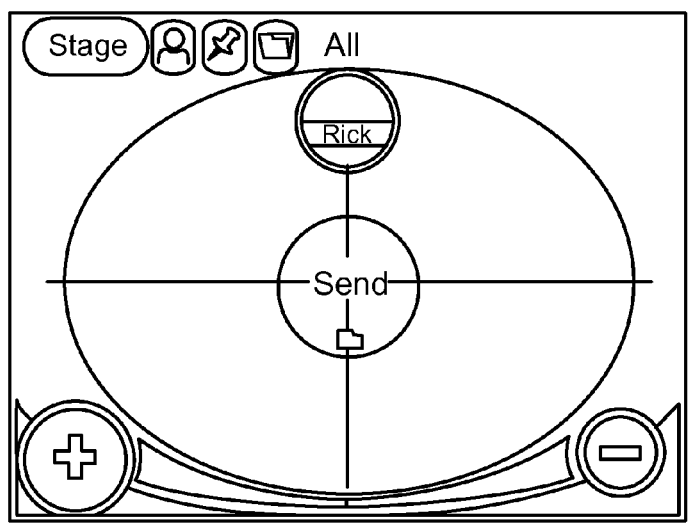

FIGS. 22B through 22J illustrate an example of the process of FIG. 22A in a visual fashion. Referring to FIG. 22B, assume that the given user has determined to send one or more data objects to one of his/her socially networked contacts (2200A), and thereby browses through a list of its 'people' data objects to designate at least one target contact to receive the message (2205A). FIG. 22B illustrates one illustration of the given user's 'people' data objects with a social map visual representation, similar to FIG. 15A. In FIG. 22C, assume that the given user selects a data object corresponding to the given user's friend "Rick", with the selection of Rick indicated by Rick's artifact in the social map being shown as highlighted in FIG. 22C. After the selection, through some other user input (e.g., such as double clicking, pressing another button, etc.), the given user indicates that Rick should be added to a staging area as a target to a message that will include at least one data object attachment. As will be appreciated, the 'people' data object corresponding to "Rick" in this case is the target of the message, but need not itself be attached to the message aside from designating the target. The staging area illustrated in FIG. 22D generally illustrates all information that is sent in a message to the target, except that the identification of the sender is added to each message and is not illustrated in the staging area for this reason. Thus, after FIG. 22D, an empty message (i.e., no data objects are yet attached) from the given user to Rick is generated, which can now be filled with data object attachments. Accordingly, FIGS. 22B through 22D correspond to 2205A of FIG. 22A, in this example.

Figure 22E:
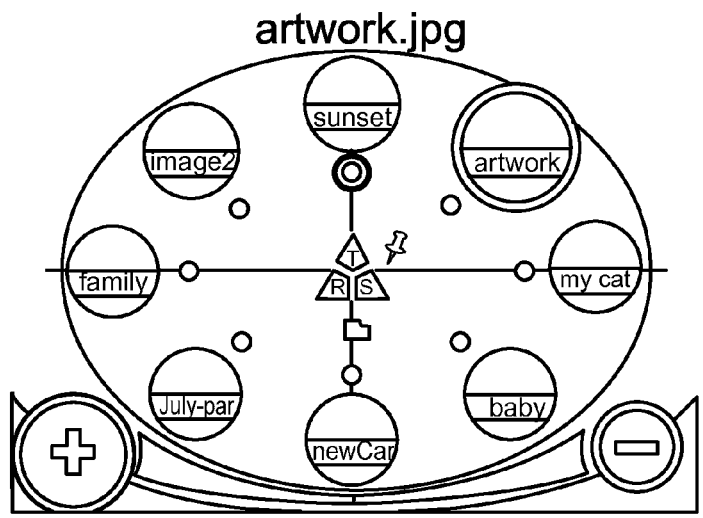
Figure 22F:
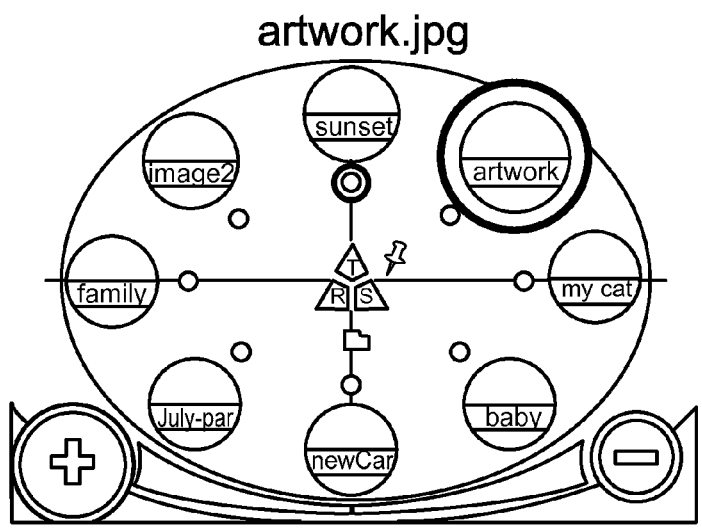
Figure 22G:
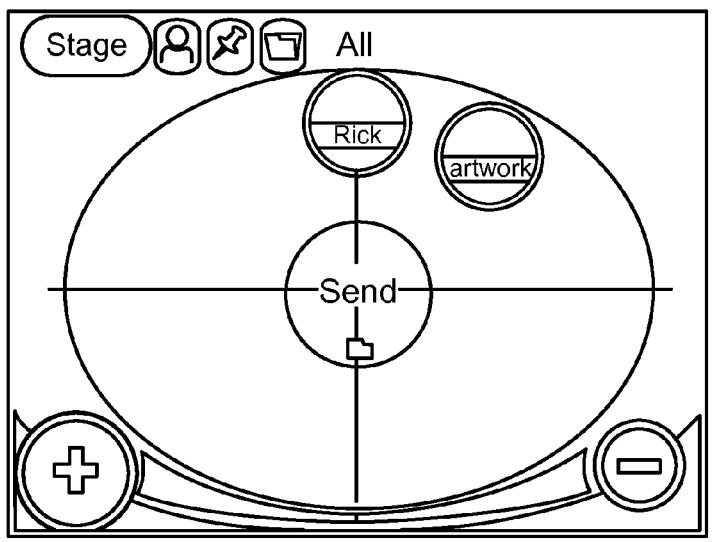

Referring to FIG. 22E, the given user next browses through 'picture' data objects, and in FIG. 22F the given user indicates a selection of a 'picture' data object corresponding to an artwork.jpg image file, which is then added to the staging area in FIG. 22G. The selection of the data object in FIG. 22F and the adding of the selected data object to the staging area in FIG. 22G may be performed in a similar manner as described above with respect to FIGS. 22C and 22D, respectively, except that the data object attached in FIGS. 22F and 22G to the staging area is not added as a target to the message, but rather as an attachment to the message. Thus, FIGS. 22E through 22G correspond to 2210A through 2220A of FIG. 22A, in this example.

Figure 22H:
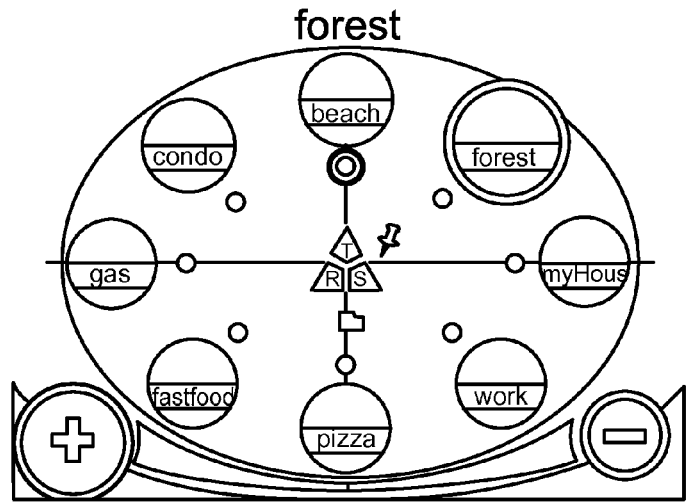
Figure 22I:
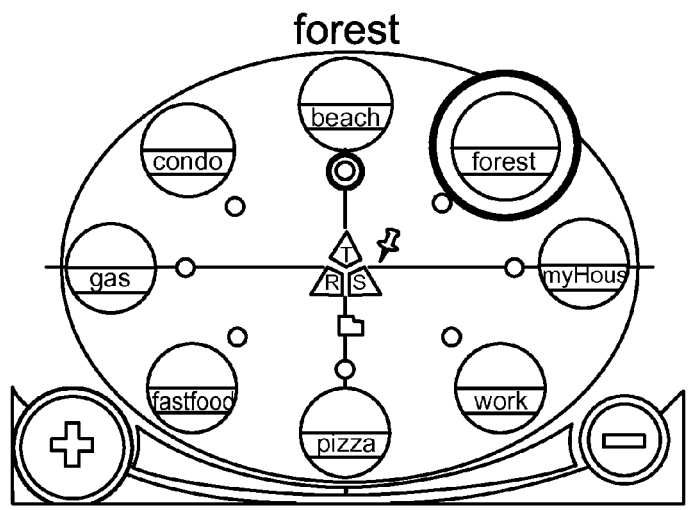
Figure 22J:
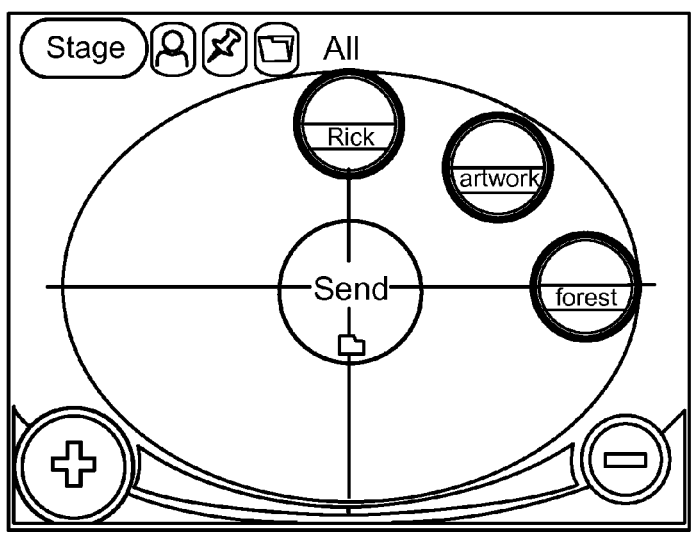

Next, referring to FIG. 22H, the given user next browses through 'places' data objects, and in FIG. 22I the given user indicates a selection of a 'places' data object corresponding to a forest location, which is then added to the staging area in FIG. 22J. The selection of the data object in FIG. 22I and the adding of the selected data object to the staging area in FIG. 22J may be performed in a similar manner as described above with respect to FIGS. 22F and 22G, respectively. Thus, FIGS. 22H through 22J correspond to another iteration of 2210A through 2220A of FIG. 22A, in this example.

At this point, in FIG. 22J, the staging area includes target data object "Rick" and data object attachments "artwork.jpg" and forest. The given user can then attach the data object attachments to a message and send the message to the data object "Rick" by indicating a selection of the Send button illustrated in the staging area, 2225A and 2230A. Alternatively, the given user can first add a textual description of the attached data objects to facilitate a contextual understanding of why the data objects are being sent to Rick (e.g., "This picture of 'artwork' is taken of the 'forest'", etc.).

Next, FIG. 23 illustrates an example of how a message including one or more data object attachments is received and viewed at the target data object. Referring to FIG. 23, a device operated by the given user receives a message including a data object attachment at a device operated by the given user (e.g., the social networking server 174, a mobile device, etc.), 2300.

Upon receiving the message in 2305, the device operated by the user displays a notification of the received message based at least in part upon attributes of the transmitting data object. For example, if the user receiving the message is Rick, and the sender of the message is Jane, and Rick and Jane are married, then the message of 2300 may be displayed as important even if Rick has no interest in the actual data object(s) contained therein. Thus, the attributes of the sender can affect how prominently to display the message notification, even if the message itself, upon further review, is not very important to the recipient.

Based on the message notification, the target user of the message determines whether to view the message, 2310. If the target user determines not to view the message, the process of FIG. 23 terminates. Otherwise, if the target user determines to view the message, the data object attachments of the message are extracted, 2315, and each extracted data object is displayed to the target user based at least in part upon the attributes of the extracted data objects.

For example, if the sender of the message is unimportant, the message notification of 2305 may initially not be prominently indicated to the target user in 2305. However, if the message itself is very important (e.g., a distant friend sends an invitation to a party that the target user was desperate to attend, etc.) then the message is displayed more prominently upon extraction in 2320.

In a further example, an important message may affect how the message notification is displayed in 2305 as well, such that an important message can cause a prominent notification even if the sender of the message is not important to the target user. Likewise, an extracted data object that appears to be unimportant could be displayed as prominent by virtue of being sent from a very important contact of the user (E.g., the CEO of the target user's company, a love interest of the target user, etc.). Thus, in at least one example, the message notification can be displayed with a prominence at least indicative of a level of importance of the sender, with a potential for a more prominent display of the message notification if the message is especially important. Likewise, the extracted data object(s) in 2315 are displayed with a prominence at least indicative of a level of importance of the extracted data object(s), with a potential for a more prominent display of the data object(s) if the sender of the message is especially important.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a client device, comprising:
   receiving a query that is configured to specify a social parameter, a temporal parameter and a spatial parameter that are relative to a set of users and are indicative of a desired processing function to be performed on a set of data objects;
   determining degrees to which the social, temporal and spatial parameters of the query are related to each of the set of data objects in social, temporal and spatial dimensions, respectively; and
   performing a first processing function on at least a portion of the set of data objects based on whether the determined degrees of relation in the social dimension, temporal dimension and spatial dimension satisfy respective parameters of the query.

2. The method of claim 1, wherein the first processing function corresponds to a display function that displays a visual representation of the portion of the set of data objects on a display of the client device.

3. The method of claim 2, wherein at least one artifact is displayed in the visual representation, wherein the at least one artifact conveys visually recognizable information and is related to the at least one data object or the set of users.

4. The method of claim 3, wherein the at least one artifact assumes characteristics of other similar artifacts associated with one or more of the determined degrees.

5. The method of claim 3, wherein the at least one data object corresponds to a socially networked contact of the set of users, and the at least one artifact corresponds to a picture related to the socially networked contact.

6. The method of claim 3, wherein the at least one data object corresponds to an activity, and the at least one artifact corresponds to a picture related to the activity.

7. The method of claim 1, wherein the set of users includes a single user.

8. The method of claim 7, wherein the single user corresponds to a user of the client device.

9. The method of claim 1, wherein the set of users includes a plurality of users that belong to a given social networking group.

10. The method of claim 9, wherein the social parameter, the temporal parameter and the spatial parameter correspond to group characteristics that are shared by each of the plurality of users that belong to the given social networking group.

11. The method of claim 1, wherein the query is configured to specify the social parameter, the temporal parameter and the spatial parameter with explicit indications of the social parameter, the temporal parameter and the spatial parameter within the query.

12. The method of claim 1, wherein the query omits an explicit indication for one or more of the social parameter, the temporal parameter and the spatial parameter.

13. The method of claim 12, wherein the query is configured to indicate that a default parameter be used for each parameter for which the explicit indication is omitted.

14. The method of claim 1, further comprising:
   modifying one or more parameters of the query; and
   transitioning from performing the first processing function to a second processing function.

15. The method of claim 14,
   wherein the first processing function corresponds to a first display function that displays a first visual representation of the portion of the set of data objects on a display of the client device, and
   wherein the second processing function corresponds to a second display function that displays a second visual representation of another portion of the set of data objects based on whether the determined degrees in the social dimension, temporal dimension and/or spatial dimension satisfy the one or more modified parameters of the query.

16. The method of claim 14, wherein the modifying corresponds to a first expansion of a range of degrees that will satisfy one of the temporal parameter, spatial parameter or social parameter of the query.

17. The method of claim 16, further comprising:
   expanding another range of degrees that will satisfy one or more parameters other than the one or more modified parameters of the query, while maintaining the first expansion.

18. The method of claim 14, wherein the modifying corresponds to a reduction of a range of degrees that will satisfy one or more of the temporal parameter, spatial parameter and/or social parameter of the query.

19. The method of claim 14, wherein the modifying modifies less than all of the parameters of the query, such that at least one parameter of the query is modified and at least one other parameter of the query remains unmodified.

20. The method of claim 14, wherein the modifying corresponds to a shifting of a range of degrees that will satisfy one of the temporal parameter, spatial parameter or social parameter of the query.

21. The method of claim 1, wherein the set of data objects includes one or more of activities, multimedia files or socially networked contacts of the set of users.

22. The method of claim 21, wherein the determined degree to which the set of users is related in the social dimension to a given data object of an activity corresponds to a level of interest the set of users is expected to have in the activity.

23. The method of claim 21, wherein the determined degree to which the set of user is related in the social dimension to a given data object of a socially networked contact corresponds to how important the socially networked contact is expected to be to the set of users.

24. The method of claim 1, wherein temporal and spatial information associated with a given data object are compared with the temporal and spatial parameters, respectively, of the query to determine the degrees of relation of the query to the given data object.

25. The method of claim 24, wherein the given data object is a socially networked contact of the set of users, and the temporal and spatial information is a location of the socially networked contact at one or more time periods.

26. The method of claim 24, wherein the temporal, spatial, and social parameters specified by the query are indicative of a time, location and social relationship of interest, and the portion of the set of data objects displayed are based on a correspondence of the determined degrees to the query parameters.

27. The method of claim 26, wherein the temporal, spatial, and social parameters specified by the query include a specified date, a city and friends of the set of users, respectively, and wherein the portion of the set of data objects includes data objects having a degree in the social dimension as friend, and degrees in the spatial and temporal dimension as near the city on the specified date.

28. The method of claim 1, further comprising:
designating at least one of the set of data objects as a target data object of a message to be built in a staging area;
selecting at least one data object as an attachment to the message;
adding the at least one data object to the staging area;
attaching each added data object in the staging area to the message; and
sending the message including each attached data object to the at least one target data object.

29. The method of claim 1, further comprising:
receiving a message from a transmitting data object, the received message including an at least one attached data object;
displaying a notification of the received message based at least in part upon attributes of the transmitting data object;
extracting the at least one attached data object from the received message; and
displaying each extracted data object based at least in part upon attributes of the extracted data object.

30. The method of claim 1, wherein attributes of at least one of the set of data objects which are used in the determining to determine the degrees to which the social, temporal and spatial parameters of the query are related to the at least one data object are modifiable by the set of users.

31. The method of claim 1, wherein the set of data objects includes at least one activity associated with the set of users.

32. The method of claim 31, wherein the temporal parameter indicates a time restriction related to when the at least one activity is expected to be performed in the future, wherein the social parameter indicates a social restriction related to the future performance of the at least one activity.

33. The method of claim 32, wherein the social restriction is to exclude activities that are not expected to include participation by contacts of the set of users that satisfy a given social relationship with the set of users.

34. The method of claim 1, wherein the set of data objects includes at least one socially networked contact of the set of users.

35. The method of claim 34, wherein the temporal parameter indicates a time restriction related to when the set of users previously communicated with the at least one socially networked contact or is expected to communicate with the at least one socially networked contact in the future.

36. A client device, comprising:
means for receiving a query that is configured to specify a social parameter, a temporal parameter and a spatial parameter that are relative to a set of users and are indicative of a desired processing function to be performed on a set of data objects;
means for determining degrees to which the social, temporal and spatial parameters of the query are related to each of the set of data objects in social, temporal and spatial dimensions, respectively; and
means for performing a processing function on at least a portion of the set of data objects based on whether the determined degrees of relation in the social dimension, temporal dimension and spatial dimension satisfy respective parameters of the query.

37. A client device, comprising:
logic configured to receive a query that is configured to specify a social parameter, a temporal parameter and a spatial parameter that are relative to a set of users and are indicative of a desired processing function to be performed on a set of data objects;
logic configured to determine degrees to which the social, temporal and spatial parameters of the query are related to each of the set of data objects in social, temporal and spatial dimensions, respectively; and
logic configured to perform a processing function on at least a portion of the set of data objects based on whether the determined degrees of relation in the social dimension, temporal dimension and spatial dimension satisfy respective parameters of the query.

38. A non-transitory computer-readable medium containing instructions stored thereon, which, when executed by a client device, cause the client device to perform operations, the instructions comprising:
at least one instruction to receive a query that is configured to specify a social parameter, a temporal parameter and a spatial parameter that are relative to a set of users and are indicative of a desired processing function to be performed on a set of data objects;
at least one instruction to determine degrees to which the social, temporal and spatial parameters of the query are related to each of the set of data objects in social, temporal and spatial dimensions, respectively; and
at least one instruction to perform a processing function on at least a portion of the set of data objects based on whether the determined degrees of relation in the social dimension, temporal dimension and spatial dimension satisfy respective parameters of the query.

39. The method of claim 1, wherein the determining is based upon a comparison between temporal and spatial information associated with a given data object with the temporal and spatial parameters, respectively, of the query.

40. The method of claim 1,
wherein at least one data object in the set of data objects is populated in a given set of containers,
wherein the given set of containers is a subset of a plurality of containers,
wherein each of the plurality of containers is configured to be populated with data objects of different data object types.

41. The method of claim 40, wherein the plurality of containers includes a people container configured to store data objects representative of people, a places container configured to store data objects representative of places, a things container configured to store data objects representative of things and/or a settings container configured to store data objects representative of settings.

42. The method of claim 40, wherein the at least one data object includes each data object in the set of data objects.

43. The method of claim 40,
wherein the query identifies the given set of containers,
wherein the determining of the degrees in the social dimension, temporal dimension and spatial dimension is implemented in a container-specific manner by excluding data objects that are not populated among the given set of containers from consideration.

44. The method of claim 40, wherein the at least one data object includes one or more data objects that are populated within more than one container.

45. The method of claim 44, wherein the one or more data objects include a given data object corresponding to a multimedia file that is representative of both a thing and a place and the given data object is populated within both a place container and a thing container.

46. The method of claim 44, wherein the one or more data objects include a given data object corresponding to a contact that is representative of both a person and a place and the given data object is populated within both the place container and a people container.

* * * * *